United States Patent
Jung et al.

(10) Patent No.: US 8,899,793 B2
(45) Date of Patent: Dec. 2, 2014

(54) ILLUMINATION UNIT AND ILLUMINATION SYSTEM USING THE SAME

(71) Applicants: Ui Youn Jung, Seoul (KR); Young Bae Jang, Seoul (KR)

(72) Inventors: Ui Youn Jung, Seoul (KR); Young Bae Jang, Seoul (KR)

(73) Assignee: LG Innotek Co. Ltd., Seoul (KR)

( * ) Notice: Subject to any disclaimer, the term of this patent is extended or adjusted under 35 U.S.C. 154(b) by 1 day.

(21) Appl. No.: 13/771,344

(22) Filed: Feb. 20, 2013

(65) Prior Publication Data

US 2013/0223079 A1    Aug. 29, 2013

(30) Foreign Application Priority Data

Feb. 23, 2012  (KR) .................. 10-2012-0018484

(51) Int. Cl.
| | |
|---|---|
| *F21V 7/00* | (2006.01) |
| *F21V 15/01* | (2006.01) |
| *F21V 8/00* | (2006.01) |
| *G02F 1/1335* | (2006.01) |
| *F21S 8/02* | (2006.01) |
| *F21Y 103/00* | (2006.01) |

(52) U.S. Cl.
CPC .............. *F21V 7/0025* (2013.01); *F21V 15/01* (2013.01); *G02B 6/0081* (2013.01); *F21Y 2103/003* (2013.01); *G02B 6/0096* (2013.01); *G02F 1/133608* (2013.01); *F21S 8/02* (2013.01)
USPC .......................... 362/297; 362/97.1; 362/97.3

(58) Field of Classification Search
CPC ............................ G09F 13/14; G09F 13/0409
USPC ........................ 362/297, 97.1, 97.3
See application file for complete search history.

(56) References Cited

U.S. PATENT DOCUMENTS

| | | | |
|---|---|---|---|
| 8,258,704 B2 * | 9/2012 | Brant ............................... | 315/77 |
| 2007/0147036 A1 | 6/2007 | Sakai et al. .................. | 362/240 |
| 2010/0182782 A1 | 7/2010 | Ladewig ..................... | 362/235 |
| 2010/0321919 A1 | 12/2010 | Yang ............................. | 362/84 |
| 2011/0211335 A1 | 9/2011 | Ko ................................ | 362/97.1 |
| 2012/0134136 A1 * | 5/2012 | Seo et al. ..................... | 362/97.1 |
| 2013/0003352 A1 * | 1/2013 | Lee et al. ..................... | 362/97.1 |

FOREIGN PATENT DOCUMENTS

| | | |
|---|---|---|
| EP | 2287520 | 2/2011 |
| WO | WO 2009/145486 | 12/2009 |

OTHER PUBLICATIONS

European Search Report for Application No. 13156365.2, dated May 27, 2013.

* cited by examiner

*Primary Examiner* — Evan Dzierzynski
(74) *Attorney, Agent, or Firm* — KED & Associates LLP

(57) ABSTRACT

Disclosed herein are an illumination unit and an illumination system. The illumination unit includes a first reflector, a second reflector, a light source module arranged between the first reflector and the second reflector, and a supporting member for supporting the second reflector. The supporting member includes first and second inclined surfaces arranged adjacent to each other at opposite sides of an inflection point. The supporting member has a distance of 15 to 50 mm between a first horizontal line horizontally passing through the inflection point and a second horizontal line horizontally passing through an end of the first inclined surface or an end of the second inclined surface. The supporting member includes projections having asymmetrical side surfaces opposing each other. The height ratio between the side surfaces of the supporting member is 1:1.01 to 80 or 1.01 to 80:1.

20 Claims, 27 Drawing Sheets

ILLUMINATION UNIT AND ILLUMINATION SYSTEM USING THE SAME

CROSS REFERENCE TO RELATED APPLICATION

This application claims priority under 35 U.S.C. §119 to Korean Application No. 10-2012-0018484, filed in Korea on Feb. 23, 2012 which is hereby incorporated in its entirety by reference as if fully set forth herein.

FIELD

Embodiments relate to an illumination unit and an illumination system.

BACKGROUND

Generally, representative large-scale display apparatuses include liquid crystal displays (LCDs), plasma display panels (PDPs), etc.

Unlike self-luminous type PDPs, LCDs require a separate illumination unit because there is no light emitting element equipped in such an LCD.

Illumination units for use in LCDs are classified into edge type illumination units and direct type illumination units according to positions of light sources. In an edge type illumination unit, light sources are arranged at left and right edges or upper and lower edges of an LCD panel, and a light guide plate is provided to uniformly distribute light throughout a surface of the LCD panel. Such an edge type illumination unit ensures enhanced light uniformity and enables production of an extremely thin display panel.

A direct type illumination unit is generally applied to displays of 20 inches or more. The direct type illumination unit advantageously has greater light efficiency than the edge type illumination unit by virtue of a plurality of light sources arranged below a panel. Accordingly, such a direct type illumination unit is mainly used in a large-scale display requiring high brightness.

Conventional edge type or direct type illumination units use cold cathode fluorescent lamps (CCFL) as light sources thereof.

Such illumination units, which use CCFLs, however, have several disadvantages, such as consumption of a great quantity of electric power because voltage should always be applied to the CCFLs, low color reproduction efficiency (about 70% that of a cathode ray tube (CRT)), and environmental pollution caused by use of mercury.

Currently, research is being conducted into illumination units using light emitting diodes (LEDs) as a solution to the above described problems.

In the case of illumination units using LEDs, turning on or off a part of an LED array is possible, so that it may be possible to achieve remarkable reduction in power consumption. In particular, RGB LEDs exhibit color reproduction exceeding a color reproduction range of 100% specified by the National Television System Committee (NTSC) and can provide more vivid images to consumers.

SUMMARY

In accordance with an embodiment, there is provided an illumination unit, which employs a metallic supporting member to support a reflector, thereby being capable of preventing damage of external circuits caused by static electricity or electromagnetic interference (EMI), and an illumination system using the illumination unit.

In accordance with another embodiment, there is provided an illumination unit, which employs a metallic supporting member provided with a plurality of fastening projections, thereby being capable of easily and simply connecting external circuits to the illumination unit, and an illumination system using the illumination unit.

In accordance with another embodiment, there is provided an illumination unit, which employs a metallic supporting member having an inclined surface, and thus has an air guide region without employing a light guide plate, and an illumination system using the illumination unit.

Additional advantages, objects, and features of the embodiments will be set forth in part in the description which follows and in part will become apparent to those having ordinary skill in the art upon examination of the following or may be learned from practice of the invention. The objectives and other advantages of the embodiments may be realized and attained by the structure particularly pointed out in the written description and claims hereof as well as the appended drawings.

To achieve the objects and other advantages and in accordance with the embodiments, as broadly described herein, an illumination unit includes a first reflector, a second reflector, a light source module arranged between the first reflector and the second reflector, and a supporting member for supporting the second reflector, wherein the supporting member includes at least one inflection point, wherein the supporting member includes first and second inclined surfaces arranged adjacent to each other at opposite sides of the inflection point, and wherein the supporting member has a distance of 15 to 50 mm between a first horizontal line horizontally passing through the inflection point and a second horizontal line horizontally passing through an end of the first inclined surface or a third horizontal line horizontally passing through an end of the second inclined surface.

The supporting member may include a conductive material. The supporting member may be a conductor.

The supporting member may include a nonconductor layer, and a conductor layer disposed on the nonconductor layer.

The supporting member may be formed with a plurality of hollows at a surface of the supporting member facing the second reflector. Each of the hollows may be formed with at least one hole at a bottom of the hollow.

Each of the hollows may include a first side surface and a second side surface facing the first side surface, the first side surface may have a first height, and the second side surface may have a second height different from the first height.

The supporting member may include a first surface facing the second reflector, a second surface opposing the first surface, and a plurality of projections respectively protruded to predetermined heights from the second surface.

Each of the projections may be formed with at least one hole at a top of the projection. Each of the projections may include a third side surface and a fourth side surface opposing the third side surface, the third side surface may have a third height, and the fourth side surface may have a fourth height different from the third height.

Each of the projections may be an empty projection.

The first and second inclined surfaces of the supporting member may have different radii of curvature.

The illumination unit may further include an optical member spaced apart from the second reflector by a predetermined distance to form a space between the optical member and the second reflector. An air guide region may be formed in the space between the second reflector and the optical member.

In another embodiment, an illumination unit includes a first reflector, a second reflector, a light source module arranged between the first reflector and the second reflector, and a supporting member for supporting the second reflector, wherein the supporting member includes a plurality of projections respectively protruded to predetermined heights from the second surface, wherein each of the projections includes third and fourth side surfaces opposing each other, wherein the third and fourth side surfaces of the projection are asymmetrical, and wherein the third side surface has a third height, the fourth side surface has a fourth height, and a ratio of the third height to the fourth height is 1:1.01 to 80 or 1.01 to 80:1.

The supporting member may include a first region arranged adjacent to an edge of the supporting member, a second region arranged adjacent to a center of the supporting member, and a third region arranged between the first region and the second region. At least one of the projections may be arranged in the first region, and the ratio of the third height to the fourth height in the projection arranged in the first region may be 1.01 to 80:1. At least one of the projections may be arranged in the second region, and the ratio of the third height to the fourth height in the projection arranged in the second region may be 1:1.05 to 3. At least one of the projections may be arranged in the third region, and the ratio of the third height to the fourth height in the projection arranged in the third region may be 1:1.01 to 1.05.

The third side surface of each of the protrusions may be spaced apart from the light source module by a first distance. The fourth side surface of the protrusion may be spaced apart from the light source module by a second distance. The first distance may be shorter than the second distance.

Each of the projections may include a top surface connecting the third side surface and the fourth side surface. The top surface of the projection may be flat. The third side surface of the projection may be inclined at a first angle from the top surface. The fourth side surface of the projection may be inclined at a second angle from the top surface. The first angle and the second angle may be different.

At least one hole may be formed at a top of each protrusion. Each of the projections may be an empty projection.

The supporting member may include first and second inclined surfaces arranged adjacent to each other at opposite sides of an inflection point. The supporting member may have a distance of 15 to 50 mm between a first horizontal line horizontally passing through the inflection point and a second horizontal line horizontally passing through an end of the first inclined surface or an end of the second inclined surface.

The first and second inclined surfaces of the supporting member may have different radii of curvature. The first inclined surface of the supporting member may be arranged adjacent to the light source module. The first inclined surface may have a smaller radius of curvature than a radius of curvature of the second inclined surface.

The supporting member may have a first distance between the first horizontal line and the second horizontal line and a second distance between the first horizontal line and the third horizontal line, and the first distance may be longer than the second distance.

The supporting member may include a conductive material.

The illumination unit may further include an optical member spaced apart from the second reflector by a predetermined distance to form a space between the optical member and the second reflector. An air guide region may be formed in the space between the second reflector and the optical member.

It is to be understood that both the foregoing general description and the following detailed description of the embodiments are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the preferred embodiments, examples of which are illustrated in the accompanying drawings.

In the following description of the embodiments, it will be understood that, when an element such as a layer (film), region, pattern, or structure is referred to as being "on" or "under" another element, it can be "directly" on or under another element or can be "indirectly" formed such that an intervening element is also present. Also, terms such as "on" or "under" should be understood on the basis of the drawings.

Furthermore, the expression "on" or "under" may be used herein to represent the relationship of one element to another element as illustrated in the figures. It will be understood that this expression is intended to encompass different orientations of the elements in addition to the orientation depicted in the figures, namely, to encompass both "on" and "under".

Figure 1:
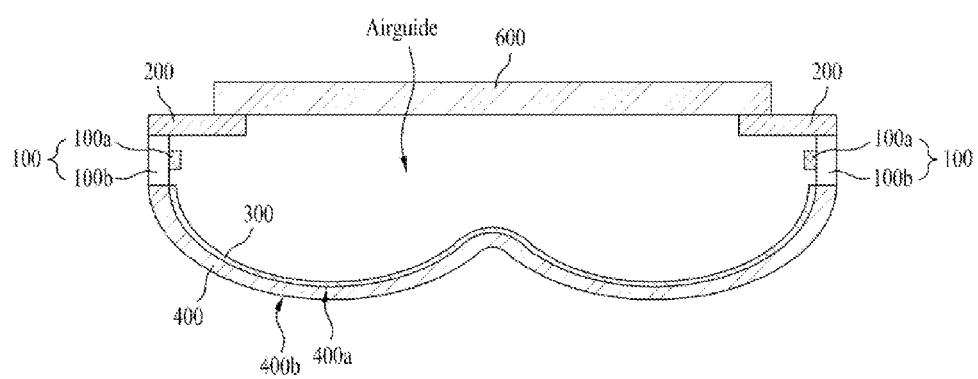
FIG. 1 is a sectional view explaining a 2-edge type illumination unit according to an embodiment.

FIG. 1 is a sectional view explaining a 2-edge type illumination unit according to an embodiment.

As shown in FIG. 1, the illumination unit may include light source modules 100, first and second reflectors 200 and 300, a supporting member 400. The illumination unit substantially has a laterally symmetrical structure in which the light source modules 100 are arranged at opposite sides of the illumination unit. Accordingly, for convenience of description, the following description will be given only in conjunction with one side of the illumination unit where one light source module 100 is arranged.

The light source module 100 may be interposed between the first reflector 200 and the second reflector 300 while being disposed adjacent to the first reflector 200 or the second reflector 300.

If necessary, the light source module 100 may be in contact with the first reflector 200 while being spaced apart from the second reflector 300 by a predetermined distance. Alternatively, the light source module 100 may be in contact with the second reflector 300 while being spaced apart from the first reflector 200 by a predetermined distance.

Also, the light source module 100 may be spaced apart from both the first and second reflectors 200 and 300 by a predetermined distance or may be in contact with both the first and second reflectors 200 and 300.

The light source module 100 may include a circuit board 100b having an electrode pattern, and at least one light source 100a arranged on the circuit board 100b.

The light source 100a of the light source module 100 may be a top view type light emitting diode.

If necessary, the light source 100a may be a side view type light emitting diode.

The circuit board 100b may be a printed circuit board (PCB) made of a material selected from polyethylene terephthalate (PET), glass, polycarbonate (PC) and silicon (Si). Alternatively, the circuit board 100b may take the form of a film.

The circuit board 100b may be selected from among a single-layer PCB, a multi-layer PCB, a ceramic board, a metal core PCB, and the like.

A reflective coating film or a reflective coating material may be formed over the circuit board 100b, to reflect light emitted from the light source 100a toward a central region of the second reflector 300.

The light source 100a may be a light emitting diode (LED) chip. The LED chip may be a blue LED chip or ultraviolet LED chip, or may be a package combining at least one or more of a red LED chip, a green LED chip, a blue LED chip, a yellow green LED chip and a white LED chip.

A white LED may be realized by coupling a yellow phosphor to a blue LED, or by coupling both a red phosphor and a green phosphor to a blue LED. Alternatively, the white LED may be realized by coupling a yellow phosphor, a red phosphor and green phosphor to a blue LED.

The first reflector 200 and second reflector 300 may face each other while being spaced apart from each other by a predetermined distance, to form an air guide region in an empty space between the first reflector 200 and the second reflector 300.

The first reflector 200 may be formed of a reflective coating film or a reflective coating material layer, to conduct a function of reflecting light emitted from the light source module 100 toward the second reflector 300.

The first reflector 200 may be formed, at a surface thereof, with sawtooth-shaped reflection patterns in a region where the surface of the first reflector 200 faces the light source module 100. The surface of each reflection pattern may be a flat surface or a curved surface.

The reason why the reflection patterns are formed at the surface of the first reflector 200 is to reflect light emitted from the light source module 100 toward a central region of the second reflector 300 in order to achieve an increase in brightness in a central region of the illumination unit.

The second reflector 300 is supported by the supporting member 400. The second reflector 300 may include a metal or a metal oxide, which has high reflectance, such as aluminum (Al), silver (Ag), gold (Au), or titanium dioxide ($TiO_2$).

The supporting member 400 may include a first surface 400a facing the second reflector 300, and a second surface 400b opposing the first surface 400a.

A plurality of projections having a predetermined height may be formed at the second surface 400b of the supporting member 400.

An external circuit board may be fastened to the second surface 400b of the supporting member 400. In this case, the external circuit board may be fixed by the projections.

The supporting member 400 may also include a conductive material. The entire portion of the supporting member 400 may be a conductor. If necessary, only a portion of the supporting member 400 may be a conductor.

The reason why the supporting member 400 includes a conductive material is to prevent damage of external circuits caused by static electricity or electromagnetic interference (EMI).

The supporting member 400 may have an inclined surface formed at a portion of the supporting member 400. The supporting member 400 may include a metal or a metal oxide, which has high reflectance, such as aluminum (Al), silver (Ag), gold (Au), or titanium dioxide ($TiO_2$).

The inclined surface of the supporting member 400 may overlap with at least one of the light source module 100 and first reflector 200.

The inclined surface of the supporting member 400 may be an inclined surface having an inclination of a predetermined angle with respect to a surface of the first reflector 200. The inclined surface may include at least one of a concave surface, a convex surface and a flat surface.

If necessary, the supporting member 400 may have at least one inclined surface and at least one flat surface. The flat surface of the supporting member 400 may be parallel with the surface of the first reflector 200.

Alternatively, the supporting member 400 may have at least two inclined surfaces having at least one inflection point.

Two inclined surfaces arranged adjacent to each other at opposite sides of one inflection point, namely, first and second inclined surfaces, may have different curvatures.

Meanwhile, an optical member 600 may be disposed to be spaced apart from the second reflector 300 by a predetermined distance and thus to form a space therebetween.

Thus, an air guide region may be formed between the space between the second reflector 300 and the optical member 600.

The optical member 600 may have a projection/groove pattern formed at an upper surface of the optical member 600.

The optical member 600 functions to diffuse light emitted from the light source module 100. In order to enhance light diffusion effects, the optical member 600 may have a projection/groove pattern formed at an upper surface of the optical member 600.

The optical member 600 may have a multilayer structure having several layers. In this case, the projection/groove pattern may be formed at a surface of an uppermost one of the layers or a surface of one of the layers.

The projection/groove pattern may have a stripe shape extending along the light source module 100.

In this case, the projection/groove pattern may include projections protruded from the surface of optical member 600. Each projection has first and second facets facing each other. The facing first and second facets form an angle, which may be acute or obtuse.

If necessary, the optical member 600 may be formed using at least one sheet. In this case, the optical member 600 may selectively include a diffusion sheet, a prism sheet, a brightness enhancing sheet, etc.

The diffusion sheet diffuses light emitted from light sources. The prism sheet guides diffused light to a light emission region. The brightness enhancing sheet enhances brightness of light.

Figure 2:
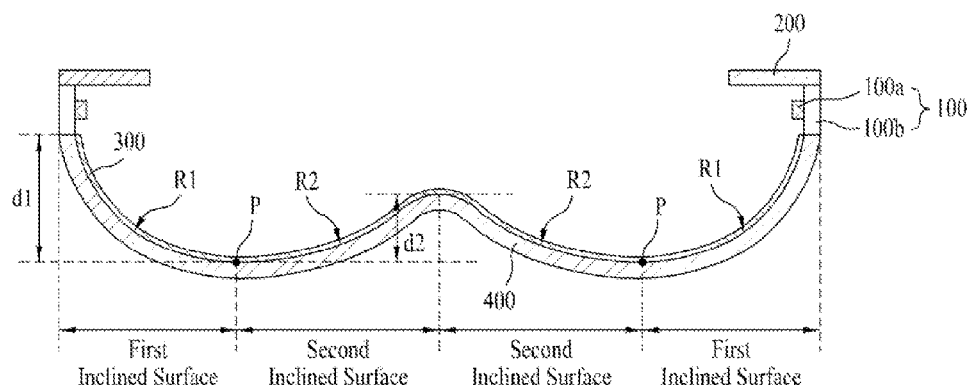
FIG. 2 is a sectional view illustrating an inclined surface of a supporting member.

FIG. 2 is a sectional view illustrating the inclined surface of the supporting member.

As shown in FIG. 2, the supporting member 400 may support the second reflector 300. The supporting member 400 may include first and second inclined surfaces arranged adjacent to each other at opposite sides of an inflection point P.

When it is assumed that the line, which horizontally passes through the inflection point P, is a first horizontal line, and the line, which horizontally passes through an end of the first inclined surface, is a second horizontal line, the distance between the first and second horizontal lines, namely, a distance d1, may be about 15 to 50 mm.

Also, when it is assumed that the line, which horizontally passes through an end of the second inclined surface, is a third horizontal line, the distance between the first and third horizontal lines, namely, a distance d2, may be about 15 to 50 mm.

If the distance d1 or d2 is shorter than 15 mm, hot spots may be formed in a region adjacent to the light source module 100. In this case, non-uniformity of brightness may occur.

On the other hand, if the distance d1 or d2 is longer than 50 mm, the thickness of the entire structure of the illumination unit may be increased, and a degradation in brightness may occur.

The distance d1 may be longer than the distance d2.

If necessary, the distances d1 and d2 may be equal. Alternatively, the distance d1 may be shorter than the distance d2.

When the supporting member 400 includes first and second inclined surfaces arranged adjacent to each other at opposite sides of an inflection point P, as described above, the first inclined surface may be a curved surface having a first radius of curvature R1, and the second inclined surface may be a curved surface having a second radius of curvature R2.

The first radius of curvature R1 and the second radius of curvature R2 may be different.

For example, the first radius of curvature R1 of the first inclined surface may be smaller than the second radius of curvature R2 of the second inclined surface.

The portion of the second reflector 300, which is disposed on the first inclined surface of the supporting member 400, may be formed of a specular reflection sheet to specularly reflect light. On the other hand, the portion of the second reflector 300, which is disposed on the second inclined surface of the supporting member 400, may be formed of at least one of a specular reflection sheet and a diffuse reflection sheet to diffusively reflect light.

The reason why a specular reflection sheet is formed over the first inclined surface of the supporting member 400 is to reflect an increased amount of light toward a central region of the supporting member 400 exhibiting low brightness, and thus to provide uniform brightness.

The reason why a diffuse reflection sheet is formed over the second inclined surface of the supporting member 400 is to diffusively reflect light from the second inclined surface of the supporting member 400 and thus to compensate brightness.

Figure 3A:
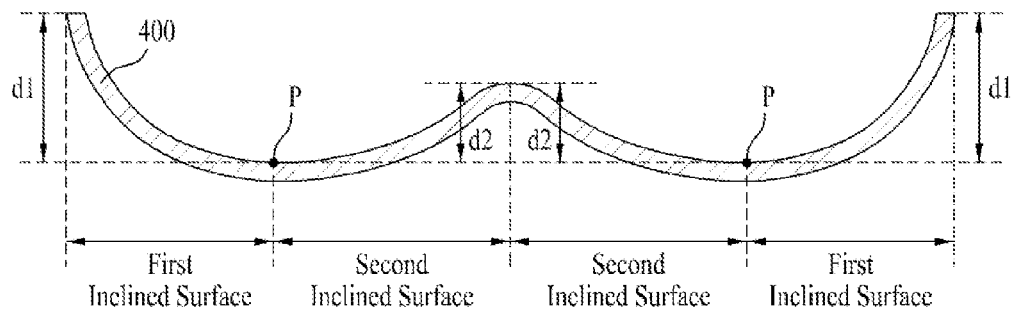
FIGS. 3A to 3C are sectional views comparing first and second inclined surfaces of the supporting member.
Figure 3B:
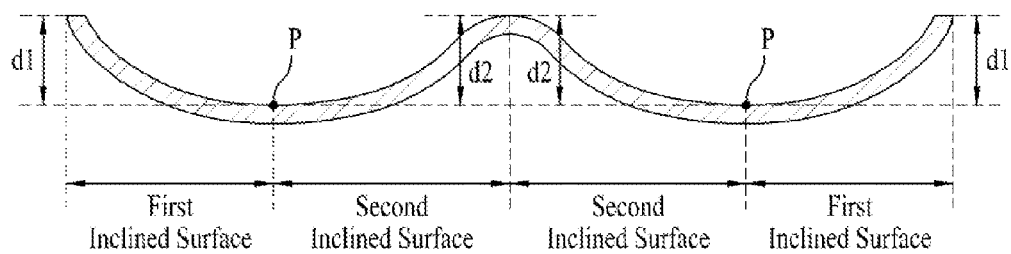
Figure 3C:
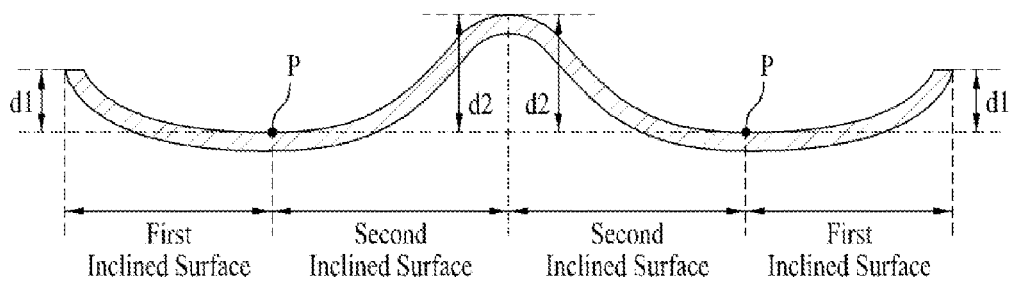

FIGS. 3A to 3C are sectional views comparing the first and second inclined surfaces of the supporting member.

As shown in FIGS. 3A to 3C, the supporting member 400 may include the first and second inclined surfaces, which are arranged adjacent to each other at opposite sides of an inflection point P.

In this case, the first inclined surface may be a curved surface having a first radius of curvature R1, and the second inclined surface may be a curved surface having a second radius of curvature R2.

The first radius of curvature R1 and the second radius of curvature R2 may be different.

For example, the first radius of curvature R1 of the first inclined surface may be smaller than the second radius of curvature R2 of the second inclined surface.

When it is assumed that the line, which horizontally passes through the inflection point P, is a first horizontal line, and the line, which horizontally passes through an end of the first inclined surface, is a second horizontal line, the distance between the first and second horizontal lines, namely, a distance d1, may be about 15 to 50 mm.

Also, when it is assumed that the line, which horizontally passes through an end of the second inclined surface, is a third horizontal line, the distance between the first and third horizontal lines, namely, a distance d2, may be about 15 to 50 mm.

The distance d1 may be longer than the distance d2, as shown in FIG. 3A.

If necessary, as shown in FIG. 3B, the distances d1 and d2 may be equal. Alternatively, the distance d1 may be shorter than the distance d2, as shown in FIG. 3C.

The reason why the distances d1 and d2 are variable is that uniformity of brightness is varied in accordance with design target values associated with the thickness of the illumination unit, the bezel area of the display device, the reflectance of the second reflector, etc.

Thus, it may be possible to manufacture the supporting member 400 through control of the distances d1 and d2 of the supporting member 400 according to desired brightness uniformity meeting a predetermined design target.

Figure 4A:
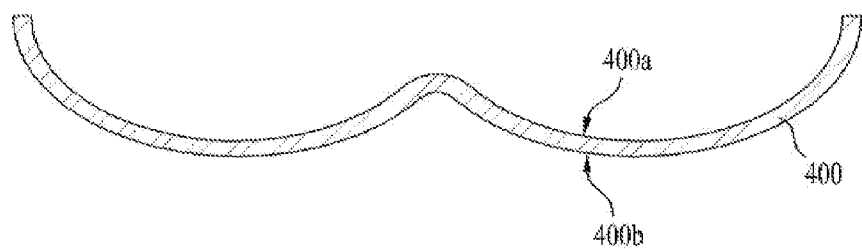
FIGS. 4A to 4C are sectional views illustrating materials of the supporting member.
Figure 4B:
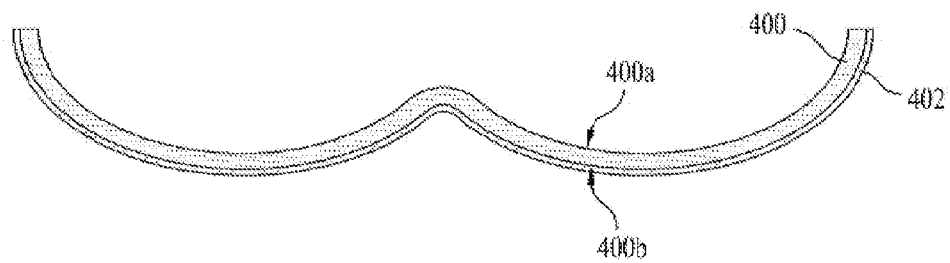
Figure 4C:
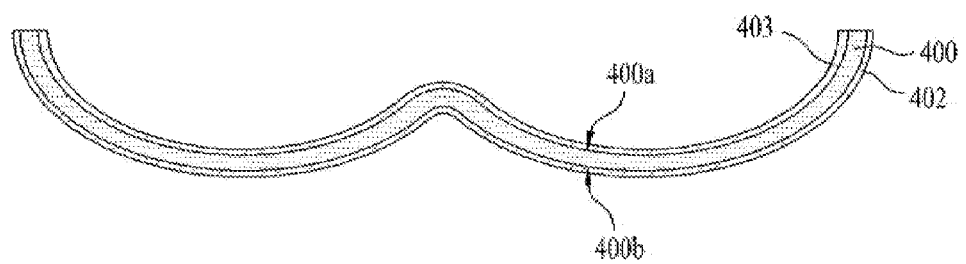

FIGS. 4A to 4C are sectional views illustrating materials of the supporting member.

As shown in FIGS. 4A to 4C, the supporting member 400 may include first and second surfaces 400a and 400b.

The second reflector may be attached to the first surface 400a of the supporting member 400.

A plurality of hollows may be formed at the first surface 400a of the supporting member 400.

In this case, the hollows may be fastened to an external circuit board attached to the second surface 400b of the supporting member 400, to fix the external circuit board.

A plurality of projections having a predetermined height may be formed at the second surface 400b of the supporting member 400.

In this case, an external circuit board may be fastened to the second surface 400b of the supporting member 400. In this case, the external circuit board may be fixed by the projections.

The supporting member 400 may also include a conductive material. The entire portion of the supporting member 400 may be a conductor. If necessary, only a portion of the supporting member 400 may be a conductor.

For example, as shown in FIG. 4A, the supporting member 400 may be made of a conductor.

In this case, the supporting member 400 may be made of a metal material. For example, the supporting member 400 may include a metal or a metal oxide, which has high reflectance, such as aluminum (Al), silver (Ag), gold (Au), or titanium dioxide ($TiO_2$).

The reason why the supporting member 400 includes a conductive material is to prevent damage of external circuits caused by static electricity or electromagnetic interference (EMI).

If necessary, the supporting member 400 may include a nonconductor, as shown in FIG. 4B.

In this case, the nonconductor of the supporting member 400 may be a polymer resin.

That is, the supporting member 400 may be formed of a nonconductor layer. A first conductor layer 402 may be disposed on one surface of the supporting member 400.

In practical, the first conductor layer 402 is disposed on the second surface 400b of the supporting member 400. This is because an external circuit board is attached to the second surface 400b of the supporting member 400.

When the supporting member 400 is a nonconductor, adverse affects may be imposed on the external circuit board due to static electricity or EMI. To this end, the first conductor layer 402 is formed over the second surface 400b of the supporting member 400, to which the external circuit board is attached, in order to prevent damage of the external circuit.

Alternatively, as shown in FIG. 4C, the supporting member 400 may be formed of a nonconductive layer, and first and second conductor layers 402 and 403 may be disposed on opposite surfaces of the supporting member 400, respectively.

That is, the first conductor layer 402 is disposed on the second surface 400b of the supporting member 400, whereas the second conductor layer 403 is disposed on the first surface 400a of the supporting member 400.

In this case, the first conductor layer 402 and second conductor layer 403 may be made of the same material. If necessary, the first and second conductor layers 402 and 403 may be made of different materials.

The reason why the first and second conductor layers 402 and 403 are made of different materials is that the intensity of static electricity or EMI generated at the first surface 400a of the supporting member 400 may differ from that of the second surface 400b of the supporting member 400.

Figure 5A:
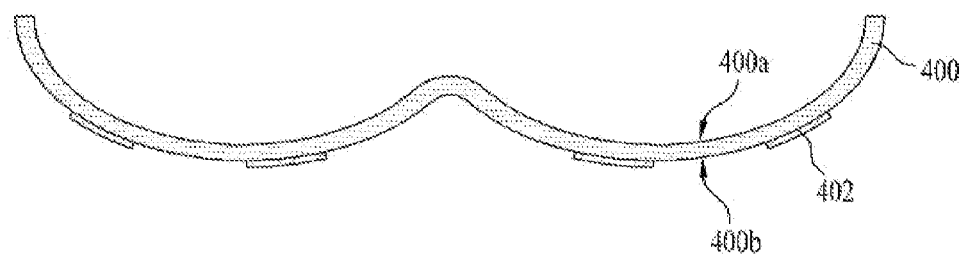
FIGS. 5A to 5C are sectional views illustrating a conductor layer or conductor layers disposed on the supporting member.
Figure 5B:
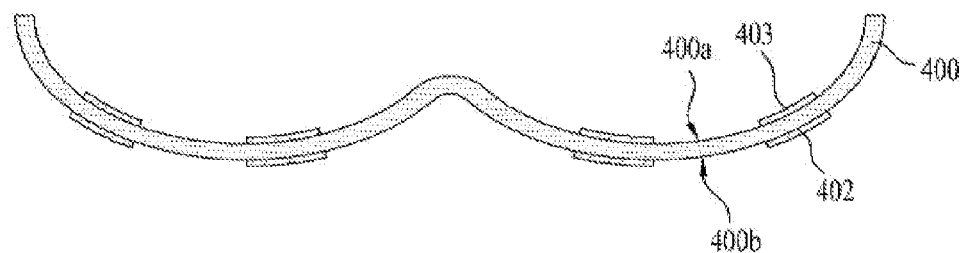
Figure 5C:
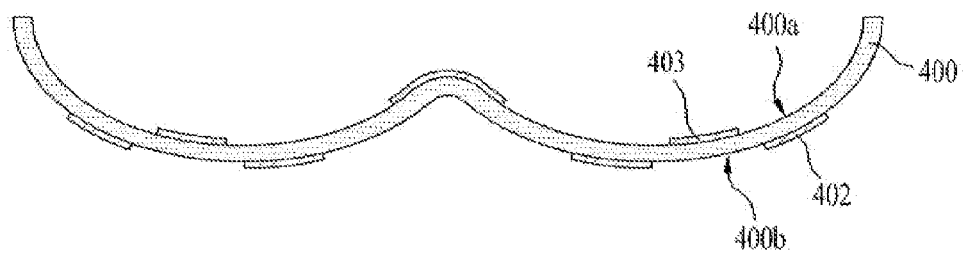

FIGS. 5A to 5C are sectional views illustrating a conductor layer or conductor layers disposed on the supporting member.

As shown in FIGS. 5A to 5C, the supporting member 400 may include a first surface 400a and a second surface 400b opposing the first surface 400a.

The supporting member 400 may include a nonconductor. In this case, the nonconductor may be a polymer resin such as a plastic material.

As shown in FIG. 5A, the supporting member may include a nonconductor layer, and a first conductor layer 402 may be disposed on one surface of the supporting member 400.

In this case, the first conductor layer 402 may be disposed on a portion of the second surface 400b of the supporting member 400. An external circuit board may be attached to the supporting member 400 in a region where the first conductor layer 402 is disposed.

As shown in FIG. 5B, the supporting member 400 may be formed of a nonconductive layer, and first and second conductor layers 402 and 403 may be disposed on opposite surfaces of the supporting member 400, respectively.

In this case, the first conductor layer 402 may be disposed on a portion of the second surface 400b of the supporting member 400, and the second conductor layer 403 may be disposed on a portion of the first surface 400a of the supporting member 400. An external circuit board may be attached to the supporting member 400 in a region where the first conductor layer 402 is disposed.

In this case, the first conductor layer 402, which is disposed on a portion of the second surface 400b of the supporting member 400, and the second conductor layer 403, which is disposed on a portion of the first surface 400a of the supporting member 400, may be arranged to oppose each other.

If necessary, as shown in FIG. 5C, the first conductor layer 402, which is disposed on a portion of the second surface 400b of the supporting member 400, and the second conductor layer 403, which is disposed on a portion of the first surface 400a of the supporting member 400, may be arranged to misalign with each other.

Figure 6:
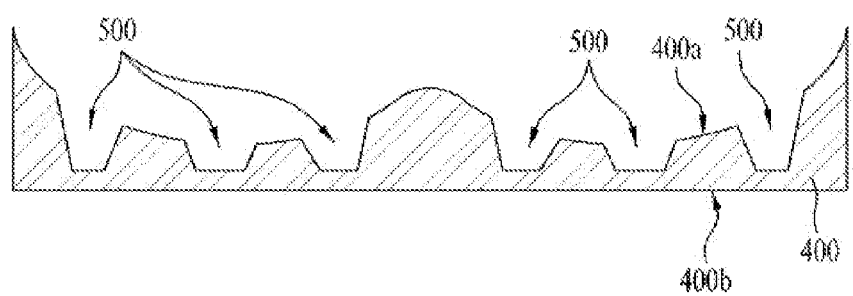
FIG. 6 is a sectional view illustrating hollows of the supporting member.

FIG. 6 is a sectional view illustrating hollows of the supporting member.

As shown in FIG. 6, the supporting member 400 may include a first surface 400a and a second surface 400b opposing the first surface 400a.

The second surface 400b of the supporting member 400 may be a flat surface. The first surface 400a of the supporting member 400 may be an inclined surface having an inclination with respect to the second surface 400b of the supporting member 400.

The first surface 400a of the supporting member 400 may include first and second inclined surfaces arranged adjacent to each other at opposite sides of an inflection point. The first and second inclined surfaces of the first surface 400a of the supporting member 400 may have different radii of curvature.

A plurality of hollows 500 may be formed at the first surface 400a of the supporting member 400.

The hollows 500 may be fastened to an external circuit board, which is attached to the second surface 400b of the supporting member 400, to fix the external circuit board.

Each hollow 500 may include first and second side surfaces facing each other. The first and second side surfaces of the hollow 500 have first and second heights, respectively, and the first and second heights may differ from each other.

The ratio of the first height to the second height in each hollow 500 may be about 1:1.01 to 80 or about 1.01 to 80:1.

Figure 7:
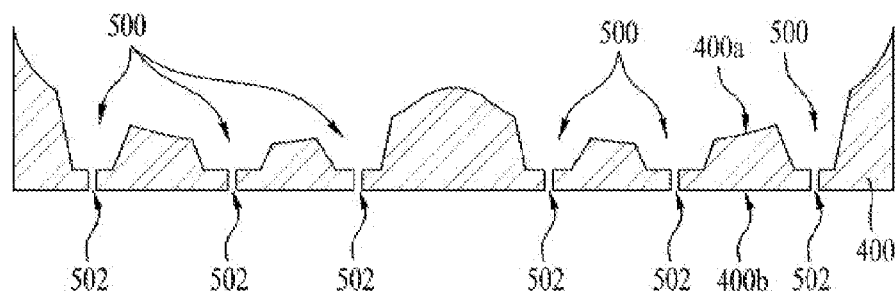
FIG. 7 is a sectional view illustrating holes formed through hollows of the supporting member.

FIG. 7 is a sectional view illustrating holes formed through hollows of the supporting member.

As shown in FIG. 7, the supporting member 400 may include a first surface 400a and a second surface 400b opposing the first surface 400a.

The second surface 400b of the supporting member 400 may be a flat surface. The first surface 400a of the supporting member 400 may be an inclined surface having an inclination with respect to the second surface 400b of the supporting member 400.

The first surface 400a of the supporting member 400 may include first and second inclined surfaces arranged adjacent to each other at opposite sides of an inflection point. The first and second inclined surfaces of the first surface 400a of the supporting member 400 may have different radii of curvature.

A plurality of hollows 500 may be formed at the first surface 400a of the supporting member 400.

At least one hole 502 may be formed through a bottom of each hollow 500.

The hole 502 formed through the bottom of the hollow 500 may be connected with a fastening member of an external circuit board disposed on the second surface 400b of the supporting member 400.

Each hollow 500 may include first and second side surfaces facing each other. The first and second side surfaces of the hollow 500 have first and second heights, respectively, and the first and second heights may differ from each other.

The ratio of the first height to the second height in each hollow 500 may be about 1:1.01 to 80 or about 1.01 to 80:1.

Figure 8A:
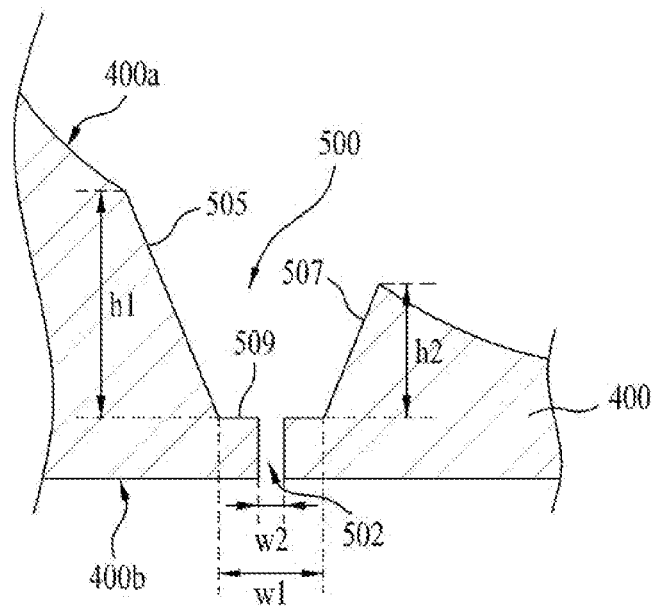
FIGS. 8A and 8B are sectional views various structures of each hollow of the supporting member, respectively.
Figure 8B:
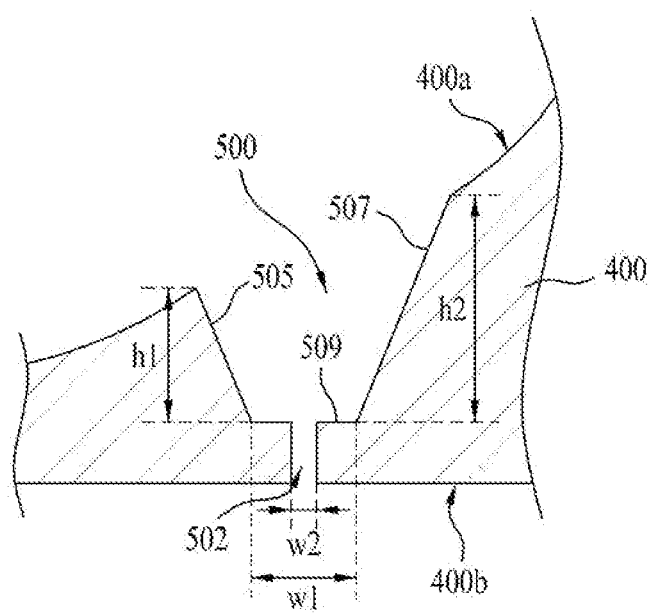

FIGS. 8A and 8B are sectional views various structures of each hollow of the supporting member, respectively.

As shown in FIG. 8A, the supporting member 400 may include a first surface 400a and a second surface 400b opposing the first surface 400a.

The second surface 400b of the supporting member 400 may be a flat surface. The first surface 400a of the supporting member 400 may be an inclined surface having an inclination with respect to the second surface 400b of the supporting member 400.

A plurality of hollows 500 may be formed at the first surface 400a of the supporting member 400.

Each hollow 500 may include a bottom surface 509, and first and second side surfaces 505 and 507 respectively disposed at opposite sides of the bottom surface 509.

The first and second side surfaces 505 and 507 of the hollow 500 have first and second heights h1 and h2, respectively, and the first and second heights h1 and h2 may differ from each other.

The ratio of the first height h1 to the second height h2 in each hollow 500 may be about 1.01 to 80:1.

The reason why the heights h1 and h2 of the first and second side surfaces 505 and 507 differ from each other is that the first surface 400a of the supporting member 400 is inclined.

In accordance with the inclination of the first surface 400a of the supporting member 400, the height ratio between the first and second side surfaces 505 and 507 of each hollow 500 may be varied.

At least one hole 502 may be formed at the bottom surface 509 of each hollow 500. The hole 502 may have a width W2 smaller than a width W1 of the bottom surface 509 of the hollow 500.

Similarly to the case of FIG. 8A, in the case of FIG. 8B, the first and second heights h1 and h2 of the first and second side surfaces 505 and 507 of each hollow 500 may differ from each other.

In this case, the ratio of the first height h1 to the second height h2 in each hollow 500 may be about 1:1.01 to 80.

Thus, the heights h1 and h2 of the first and second side surfaces 505 and 507 of each hollow 500 may be varied in accordance with an inclination direction of the first surface 400a of the supporting member 400.

Figure 9A:
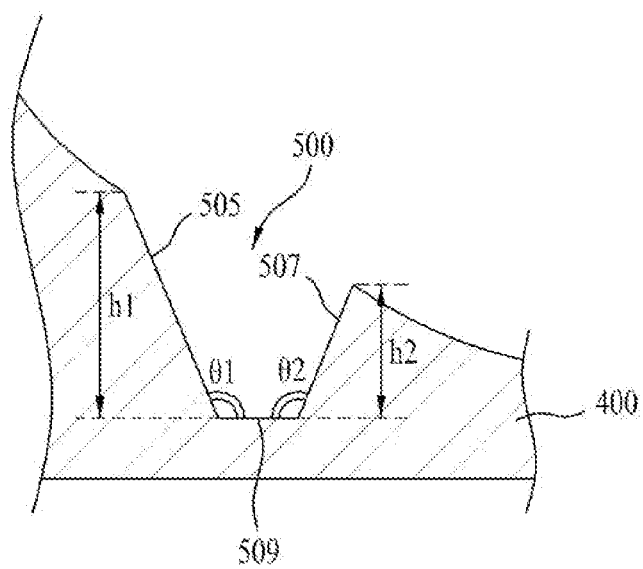
FIGS. 9A to 9C are sectional views illustrating shapes of side surfaces of each hollow, respectively.
Figure 9B:
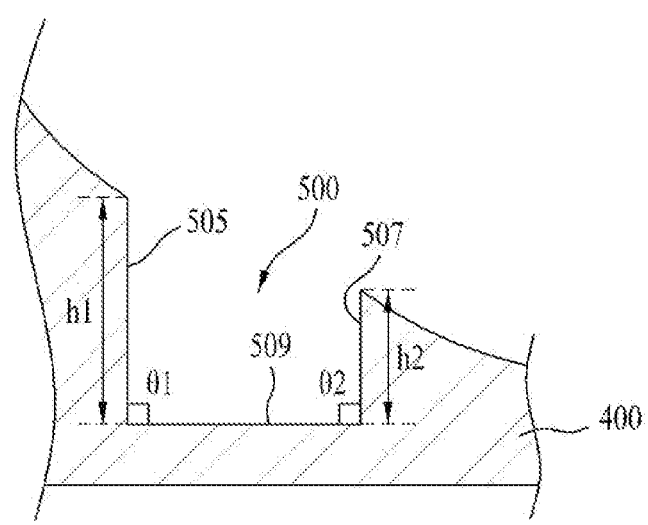
Figure 9C:
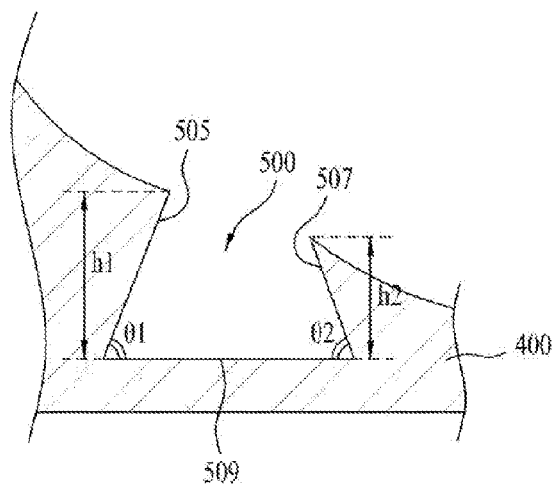

FIGS. 9A to 9C are sectional views illustrating shapes of side surfaces of each hollow, respectively.

As shown in FIGS. 9A to 9C, a plurality of hollows 500 may be formed at the supporting member 500, and each hollow 500 may include a bottom surface 509, and first and second side surfaces 505 and 507 respectively disposed at opposite sides of the bottom surface 509.

The first and second side surfaces 505 and 507 of the hollow 500 have first and second heights h1 and h2, respectively, and the first and second heights h1 and h2 may differ from each other.

The ratio of the first height h1 to the second height h2 in each hollow 500 may be about 1.01 to 80:1 or 1:1.01 to 80.

As shown in FIG. 9A, the first side surface 505 of each hollow 500 may be inclined at a first angle θ1 with respect to the bottom surface 509 of the hollow 500. Also, the second side surface 507 of each hollow 500 may be inclined at a second angle θ2 with respect to the bottom surface 509 of the hollow 500.

In this case, the first angle θ1 and second angle θ2 may be obtuse, and may be equal. If necessary, the first angle θ1 and second angle θ2 may be different.

As shown in FIG. 9B, the first side surface 505 of each hollow 500 may be perpendicular to the bottom surface 509 of the hollow 500. Also, the second side surface 507 of each hollow 500 may be perpendicular to the bottom surface 509 of the hollow 500.

In this case, the first angle θ1 and second angle θ2 may be a right angle.

Alternatively, as shown in FIG. 9C, the first side surface 505 of each hollow 500 may be inclined at a first angle with respect to the bottom surface 509 of the hollow 500. Also, the second side surface 507 of each hollow 500 may be inclined at a second angle θ2 with respect to the bottom surface 509 of the hollow 500.

In this case, the first angle θ1 and second angle θ2 may be acute, and may be equal. If necessary, the first angle θ1 and second angle θ2 may be different.

Figure 10:
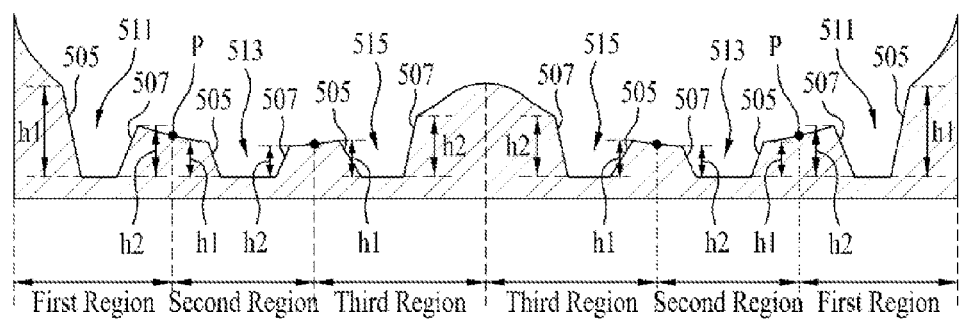
FIG. 10 is a sectional view illustrating a size of each hollow varying in accordance with a position of the supporting member.

FIG. 10 is a sectional view illustrating a size of each hollow varying in accordance with a position of the supporting member.

As shown in FIG. 10, the supporting member 400 may include a first region arranged adjacent to an edge of the supporting member 400, a second region arranged adjacent to a center of the supporting member 400, and a third region arranged between the first and second regions.

In this case, the supporting member 400 may include first and second inclined surfaces arranged adjacent to each other at opposite sides of an inflection point P. The first region of the supporting member 400 may be arranged at the first inclined surface, whereas the second and third regions of the supporting member 400 may be arranged at the second inclined surface.

A first hollow 511 may be disposed in the first region of the supporting member 400. A second hollow 515 may be disposed in the second region of the supporting member 400. A third hollow 513 may be disposed in the third region of the supporting member 400.

In the first hollow 511, which is disposed in the first region of the supporting member 400, the ratio of the first height h1 of the first side surface 505 to the second height h2 of the second side surface 507 may be about 1.01 to 80:1.

On the other hand, in the second hollow 515, which is disposed in the second region of the supporting member 400, the ratio of the first height h1 of the first side surface 505 to the second height h2 of the second side surface 507 may be about 1:1.05 to 3.

Also, in the third hollow 513, which is disposed in the third region of the supporting member 400, the ratio of the first height h1 of the first side surface 505 to the second height h2 of the second side surface 507 may be about 1:1.01 to 1.05.

Thus, the heights h1 and h2 of the first and second side surfaces 505 and 507 of each hollow may be varied in accordance with a position of the hollow and an inclination direction of the supporting member 400.

Figure 11:
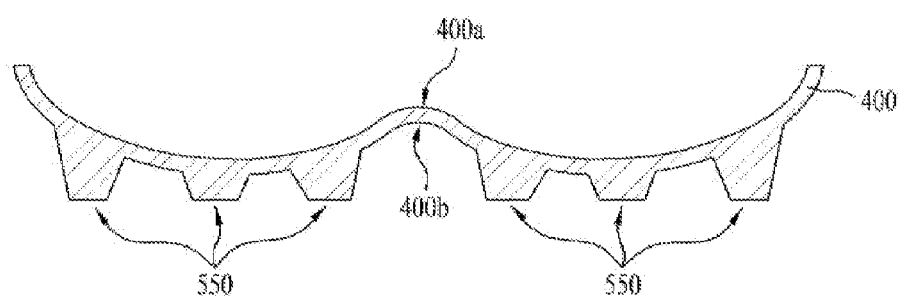
FIG. 11 is a sectional view illustrating projections of the supporting member.

FIG. 11 is a sectional view illustrating projections of the supporting member.

As shown in FIG. 11, the supporting member 400 may include a first surface 400a and a second surface 400b opposing the first surface 400a.

In this case, the first surface 400a of the supporting member 400 may include first and second inclined surfaces arranged adjacent to each other at opposite sides of an inflection point. The first and second inclined surfaces of the first surface 400a of the supporting member 400 may have different radii of curvature.

A plurality of projections 550 respectively having predetermined heights may be formed at the second surface 400b of the supporting member 400.

The projections 550 are fastened to an external circuit board attached to the second surface 400b of the supporting member 400, to fix the external circuit board.

Each projection 550 may include third and fourth side surfaces opposing each other. The heights of the third and fourth side surfaces of each projection 550, namely, a third height and a fourth height, may be different.

The third height of the third side surface to the fourth height of the fourth side surface in each projection 550 may be about 1:1.01 to 80 or about 1.01 to 80:1.

Figure 12:
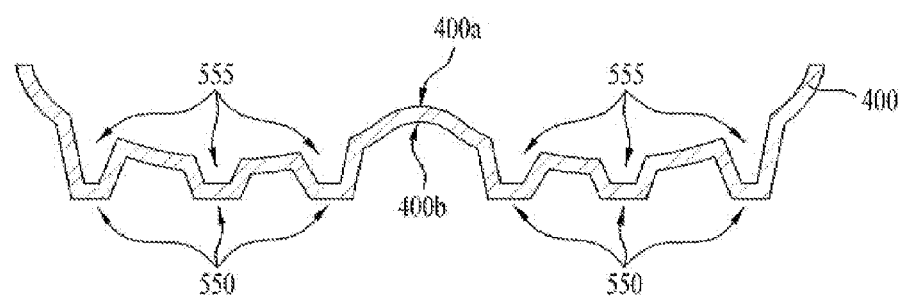
FIG. 12 is a sectional view illustrating empty projections.

FIG. 12 is a sectional view illustrating empty projections.

As shown in FIG. 12, the supporting member 400 may include a first surface 400a and a second surface 400b opposing the first surface 400a.

In this case, the first surface 400a of the supporting member 400 may include first and second inclined surfaces arranged adjacent to each other at opposite sides of an inflection point. The first and second inclined surfaces of the first surface 400a of the supporting member 400 may have different radii of curvature.

A plurality of projections 550 may be formed at the second surface 400b of the supporting member 400. Each projection 550 may be an empty projection.

That is, a plurality of grooves 555 may be formed at the first surface 400a of the supporting member 400 such that they are arranged to correspond to respective projections 550.

Figure 13:
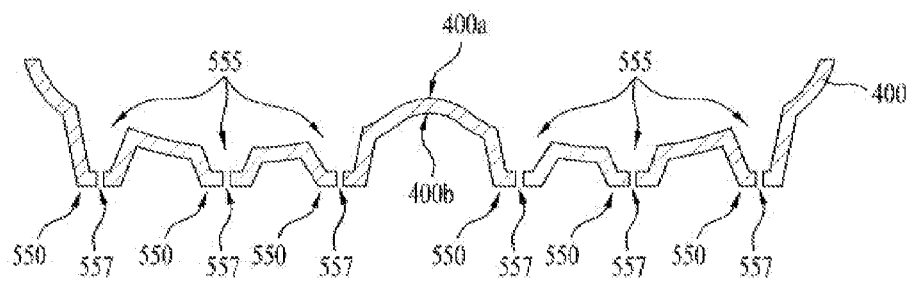
FIG. 13 is a sectional view illustrating holes formed through respective projections of FIG. 12.

FIG. 13 is a sectional view illustrating holes formed through respective projections of FIG. 12.

As shown in FIG. 13, the supporting member 400 may include a first surface 400a and a second surface 400b opposing the first surface 400a.

In this case, the first surface 400a of the supporting member 400 may include first and second inclined surfaces arranged adjacent to each other at opposite sides of an inflection point. The first and second inclined surfaces of the first surface 400a of the supporting member 400 may have different radii of curvature.

A plurality of projections 550 may be formed at the second surface 400b of the supporting member 400.

At least one hole 557 may be formed through a top of each projection 550.

The hole 557 formed through the top of the projection 550 may be connected with a fastening member of an external circuit board disposed on the second surface 400b of the supporting member 400.

Each projection 550 may include third and fourth side surfaces opposing each other. The heights of the third and fourth side surfaces of each projection 550, namely, a third height and a fourth height, may be different.

The third height of the third side surface to the fourth height of the fourth side surface in each projection 550 may be about 1:1.01 to 80 or about 1.01 to 80:1.

Figure 14A:
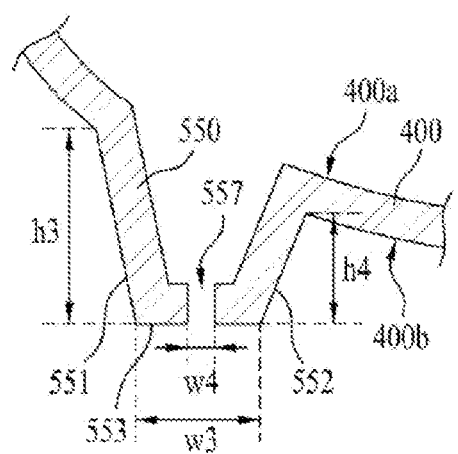
FIGS. 14A and 14B are sectional views illustrating various structures of each projection of the supporting member, respectively.
Figure 14B:
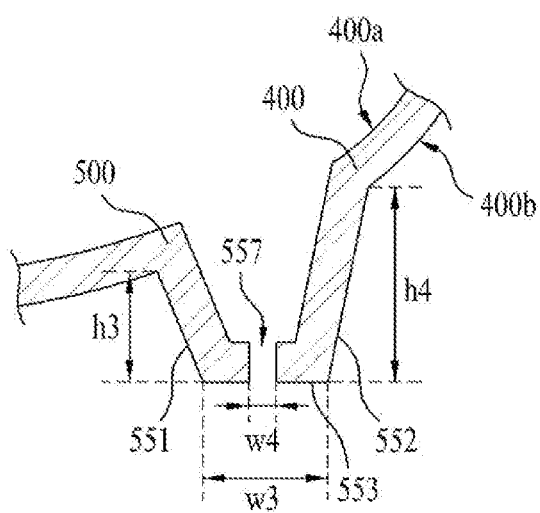

FIGS. 14A and 14B are sectional views illustrating various structures of each projection of the supporting member, respectively.

As shown in FIG. 14A, the supporting member 400 may include a first surface 400a and a second surface 400b opposing the first surface 400a.

In this case, the supporting member 400 may also include a plurality of projections 550 each protruded to a predetermined height from the second surface 400b.

Each projection 550 may include a top surface 553, and third and fourth side surfaces 551 and 552 respectively disposed at opposite sides of the top surface 553. In this case, the heights of the third and fourth side surfaces 551 and 552 of each projection 550, namely, a third height h3 and a fourth height h4, may be different.

The third height h3 of the third side surface 551 to the fourth height h4 of the fourth side surface 552 in each projection 550 may be about 1:1.01 to 80 or about 1.01 to 80:1.

The reason why the heights of the third and fourth side surfaces 551 and 552 of each projection 550 differ from each other is that the first and second surfaces 400a and 400b of the supporting member 400 are inclined.

Thus, in accordance with the inclinations of the first and second surfaces 400a and 400b of the supporting member 400, the height ratio between the third and fourth side surfaces 505 and 507 of each projection 550 may be varied.

Figure 15A:
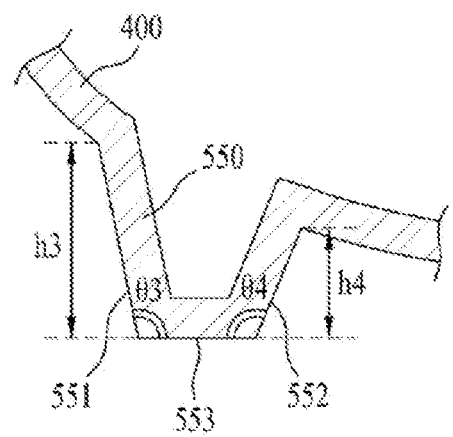
FIGS. 15A to 15C are sectional views illustrating shapes of side surfaces of each projection, respectively.
Figure 15B:
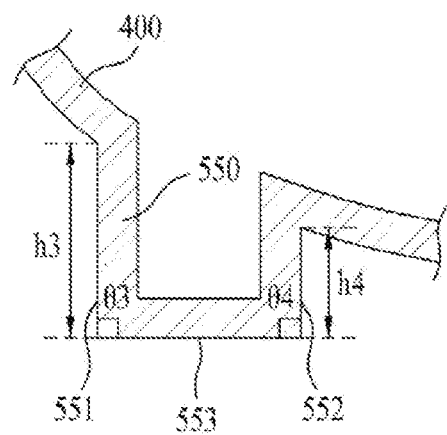
Figure 15C:
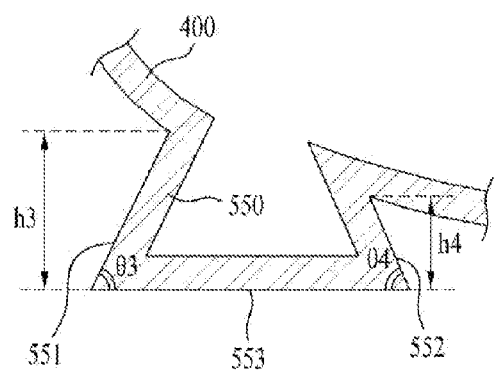

FIGS. 15A to 15C are sectional views illustrating shapes of side surfaces of each projection, respectively.

As shown in FIGS. 15A to 15C, a plurality of projections 550 may be formed at the supporting member 500, and each projection 550 may include a top surface 553, and third and fourth side surfaces 551 and 552 respectively disposed at opposite sides of the top surface 553.

In this case, the heights of the third and fourth side surfaces 551 and 552 of each projection 550, namely, a third height h3 and a fourth height h4, may be different.

The third height h3 of the third side surface 551 to the fourth height h4 of the fourth side surface 552 in each projection 550 may be about 1:1.01 to 80 or about 1.01 to 80:1.

Also, as shown in FIG. 15A, the third side surface 551 of each projection 550 may be inclined at a third angle $\theta3$ with respect to the top surface 553 of the projection 550. Also, the fourth side surface 552 of each projection 550 may be inclined at a fourth angle $\theta4$ with respect to the top surface 553 of the projection 550.

In this case, the third angle $\theta3$ and fourth angle $\theta4$ may be obtuse, and may be equal. If necessary, the third angle $\theta3$ and fourth angle $\theta4$ may be different.

As shown in FIG. 15B, the third side surface 551 of each projection 550 may be perpendicular to the top surface 553 of the projection 550. Also, the fourth side surface 552 of each projection 550 may be perpendicular to the top surface 553 of the projection 550.

In this case, the third angle $\theta3$ and fourth angle $\theta4$ may be a right angle.

Alternatively, as shown in FIG. 15C, the third side surface 551 of each projection 550 may be inclined at a third angle $\theta3$ with respect to the top surface 553 of the projection 550. Also, the fourth side surface 552 of each projection 550 may be inclined at a fourth angle θ4 with respect to the top surface 553 of the projection 550.

In this case, the third angle θ3 and fourth angle θ4 may be acute, and may be equal. If necessary, the third angle θ3 and fourth angle θ4 may be different.

Figure 16:
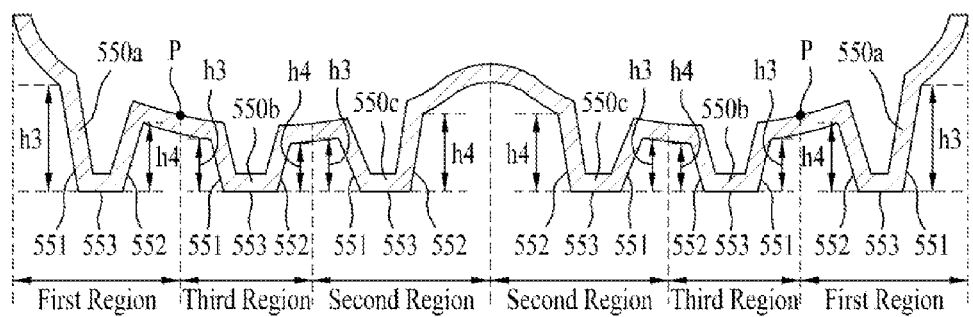
FIG. 16 is a sectional view illustrating a size of each projection varying in accordance with a position of the supporting member.

FIG. 16 is a sectional view illustrating a size of each projection varying in accordance with a position of the supporting member.

As shown in FIG. 16, the supporting member 400 may include a first region arranged adjacent to an edge of the supporting member 400, a second region arranged adjacent to a center of the supporting member 400, and a third region arranged between the first and second regions.

In this case, the supporting member 400 may include first and second inclined surfaces arranged adjacent to each other at opposite sides of an inflection point P. The first region of the supporting member 400 may be arranged at the first inclined surface, whereas the second and third regions of the supporting member 400 may be arranged at the second inclined surface.

A first projection 550a may be disposed in the first region of the supporting member 400. A second projection 550c may be disposed in the second region of the supporting member 400. A third projection 550b may be disposed in the third region of the supporting member 400.

In the first projection 550a, which is disposed in the first region of the supporting member 400, the ratio of the third height h3 of the third side surface 551 to the fourth height h4 of the fourth side surface 552 may be about 1.01 to 80:1.

On the other hand, in the second projection 550c, which is disposed in the second region of the supporting member 400, the ratio of the third height h3 of the third side surface 551 to the fourth height h4 of the fourth side surface 552 may be about 1:1.05 to 3.

Also, in the third projection 550b, which is disposed in the third region of the supporting member 400, the ratio of the third height h3 of the third side surface 551 to the fourth height h4 of the fourth side surface 552 may be about 1:1.01 to 1.05.

Thus, the heights h3 and h4 of the third and fourth side surfaces 551 and 552 of each projection may be varied in accordance with a position of the projection and an inclination direction of the supporting member 400.

Figure 17:
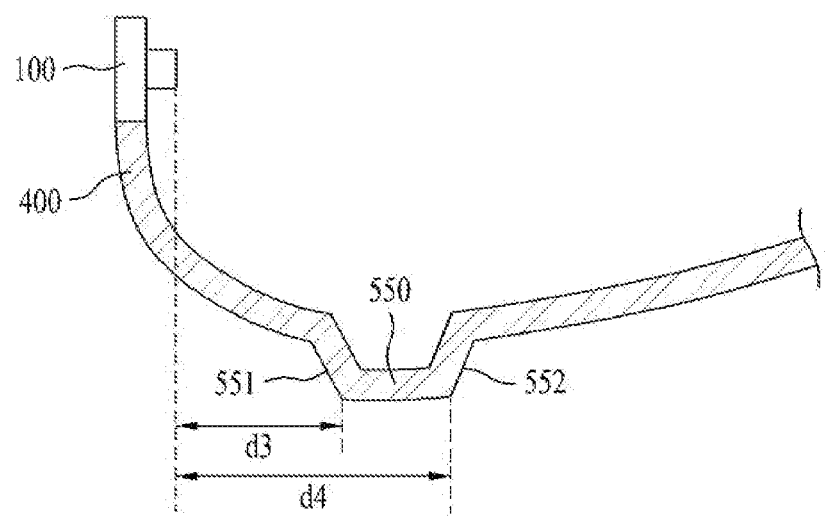
FIG. 17 is a sectional view illustrating arrangement of the side surfaces of each projection.

FIG. 17 is a sectional view illustrating arrangement of the side surfaces of each projection.

As shown in FIG. 17, the light source module 100 is arranged at an end of the supporting member 400. Also, the supporting member 400 may include a projection 550 having a predetermined height.

In this case, the projection 550 may include a third side surface 551 and a fourth side surface 552. The third side surface 551 of the projection 550 may face an edge region of the supporting member 400, whereas the fourth side surface 552 of the projection 550 may face a central region of the supporting member 400.

In this case, the distance between the third side surface 551 of the projection 550 and the light source module 100, namely, a distance d3, may be shorter than the distance between the fourth side surface 552 of the projection 550 and the light source module 100, namely, a distance d4.

Figure 18A:
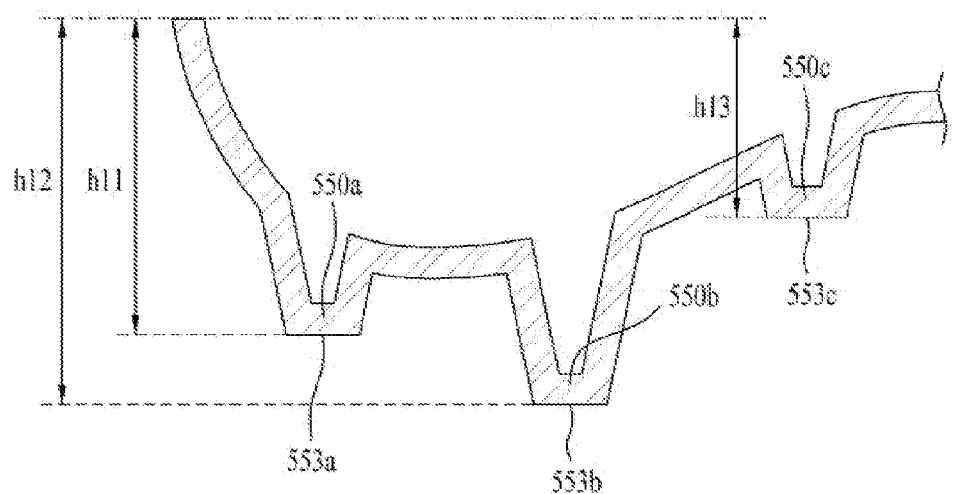
FIGS. 18A and 18B are sectional views comparing heights of adjacent projections.
Figure 18B:
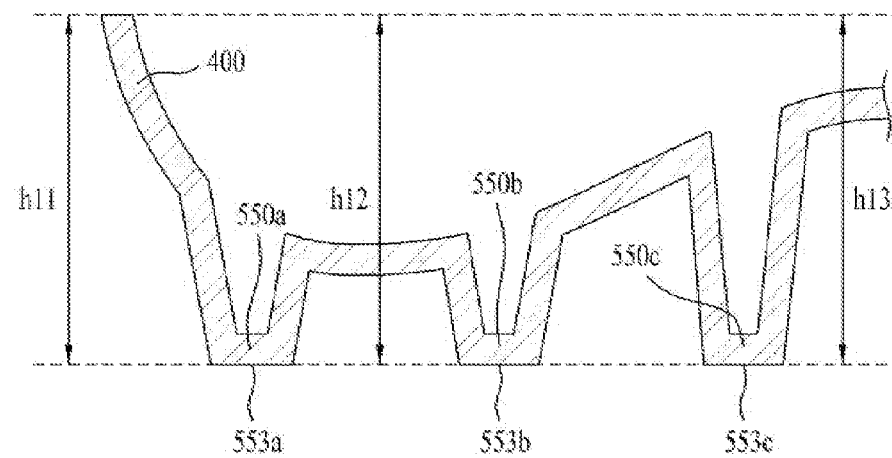

FIGS. 18A and 18B are sectional views comparing heights of adjacent projections.

As shown in FIGS. 18A and 18B, the supporting member 400 may include a plurality of projections respectively protruded to predetermined heights.

In the illustrated cases, each projection may include third and fourth side surfaces opposing each other. The third and fourth side surfaces of the projection may be asymmetrical.

Each projection includes a top surface disposed between the third and fourth side surfaces. The top surface of the projection may be a flat surface, and the third and fourth side surfaces may be inclined at predetermined angles with respect to the top surface, respectively.

The top surfaces of the adjacent projections may not be flush with each other. If necessary, the top surfaces of the adjacent projections may be flush with each other.

For example, as shown in FIG. 18A, when first and second projections 550a and 550c are arranged at opposite sides of a third projection 550b, respectively, the top surface of the third projection 550b, namely, a top surface 550b, may not be flush with top surfaces 553a and 553c of the first and second projections 550a and 550c.

The vertical distance between a horizontal line passing through an end of the supporting member 400 and a horizontal line passing through a point on the top surface 553b of the third projection 550b, namely, a height h12, may be longer than the vertical distance between the horizontal line passing through the end of the supporting member 400 and a horizontal line passing through a point on the top surface 553c of the second projection 550c, namely, a height h13.

Also, the vertical distance between the horizontal line passing through the end of the supporting member 400 and a horizontal line passing through a point on the top surface 553a of the first projection 550a, namely, a height h11, may be longer than the vertical distance between the horizontal line passing through the end of the supporting member 400 and the horizontal line passing through the point on the top surface 553c of the second projection 550c, namely, the height h13.

In another example, as shown in FIG. 18B, when first and second projections 550a and 550c are arranged at opposite sides of a third projection 550b, respectively, the top surface of the third projection 550b, namely, a top surface 550b, may be flush with top surfaces 553a and 553c of the first and second projections 550a and 550c.

That is, the vertical distance between a horizontal line passing through an end of the supporting member 400 and a horizontal line passing through a point on the top surface 553b of the third projection 550b, namely, a height h12, may be equal to the vertical distance between the horizontal line passing through the end of the supporting member 400 and a horizontal line passing through a point on the top surface 553a of the first projection 550a, namely, a height h11.

Also, the vertical distance between the horizontal line passing through the end of the supporting member 400 and the horizontal line passing through the point on the top surface 553b of the third projection 550b, namely, the height h12, may be longer than the vertical distance between the horizontal line passing through the end of the supporting member 400 and a horizontal line passing through a point on the top surface 553c of the second projection 550c, namely, a height h13.

Figure 19:
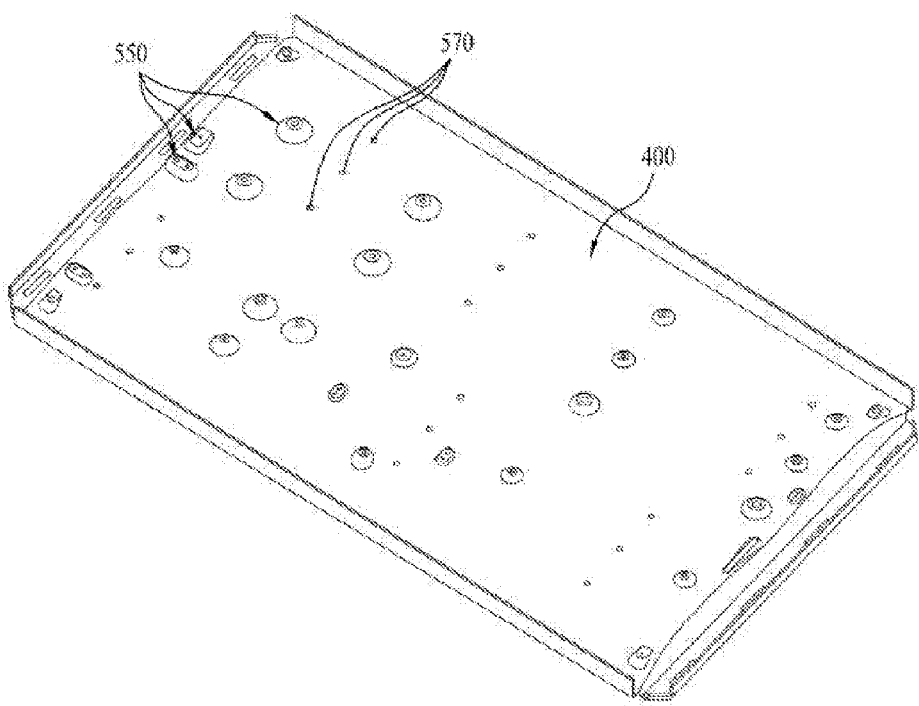
FIG. 19 is a perspective view illustrating the supporting member at which projections are provided.

FIG. 19 is a perspective view illustrating the supporting member at which projections are provided.

As shown in FIG. 19, the supporting member 400 may include a first surface on which the second reflector is disposed, and a second surface on which an external circuit board is disposed.

In this case, the supporting member 400 may include first and second inclined surfaces arranged adjacent to each other at opposite sides of an inflection point. The first and second inclined surfaces of the supporting member 400 may have different radii of curvature.

The supporting member 400 may also include a plurality of projections 550 each projected to a predetermined height from the second surface.

In this case, the projections 550 may be fastened to the external circuit board which is attached to the second surface of the supporting member 400, to fix the external circuit board.

Each projection 550 may include third and fourth side surfaces opposing each other. The third and fourth side surfaces of each projection 550 may be asymmetrical.

The reason why the third and fourth side surfaces of each projection 550 are asymmetrical is that the projection 550 is disposed on one of the inclined surfaces of the supporting member 400.

Fastening holes 570 may be arranged around the projections 550 of the supporting member 400.

The fastening holes 570 may be connected to fastening members for fastening the second reflector.

The projections 550 of the supporting member 400 may have various shapes in accordance with positions thereof.

FIGS. 20A to 20E are perspective views illustrating various projection shapes of the supporting member.

As shown in FIGS. 20A to 20E, the projection 550 may be projected to a predetermined height from the supporting member 400.

In this case, the projection 550 may include a top surface 553, and third and fourth side surfaces 551 and 552 arranged at opposite sides of the top surface 553.

The third and fourth side surfaces 551 and 552 of the projection 550 may be asymmetrical.

That is, the height of the third side surface 551 of the projection 550 may differ from the height of the fourth side surface 552 of the projection 550.

For example, the ratio of the height of the third side surface 551 to the height of the fourth side surface 552 in the projection 550 may be about 1:1.01 to 80 or about 1.01 to 80:1.

The side surfaces of the projection 550 may be a flat surface or a curved surface.

At least one hole 557 may be formed at the top surface 553 of the projection 550.

The hole 557 may have various sizes in accordance with the area of the top surface 553 of the projection 550.

Figure 20A:
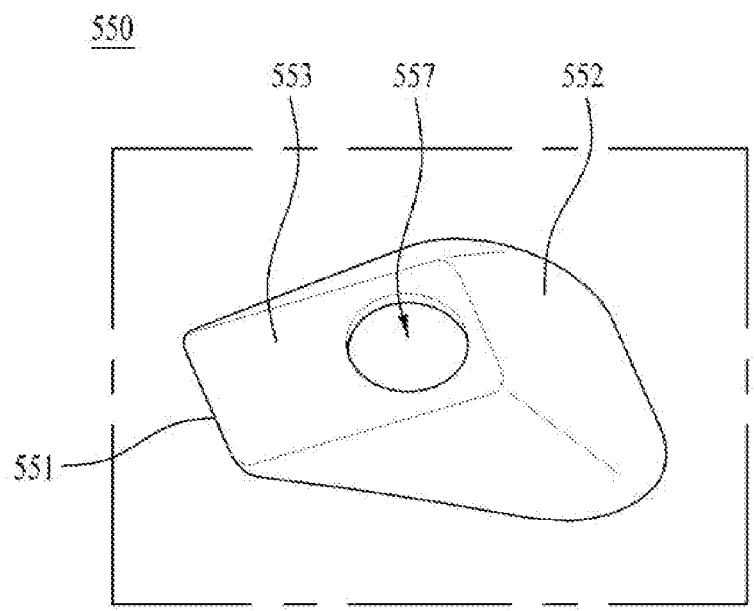
FIGS. 20A to 20E are perspective views illustrating various projection shapes of the supporting member.
Figure 20B:
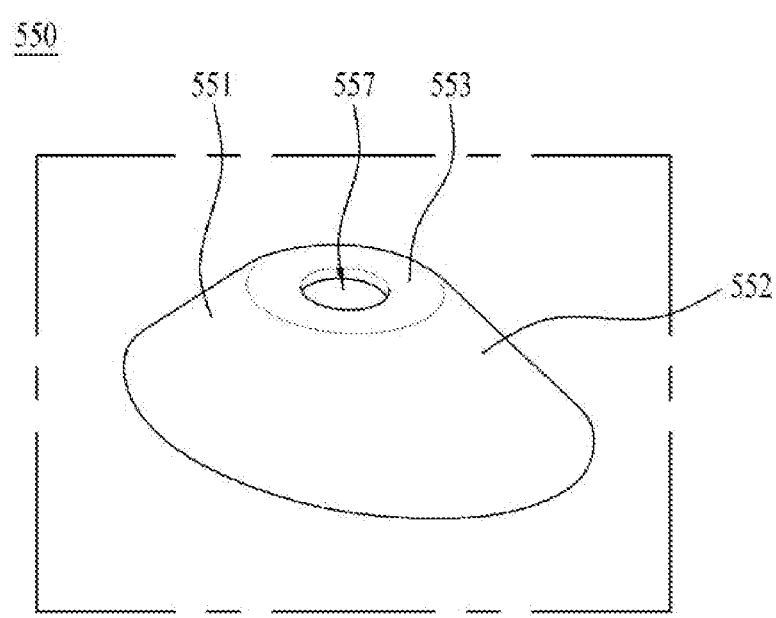
Figure 20C:
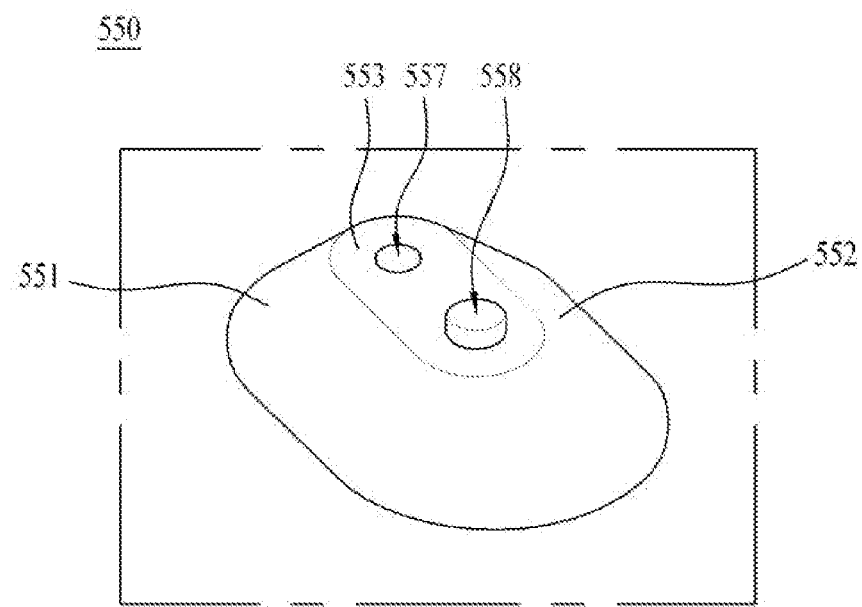
Figure 20D:
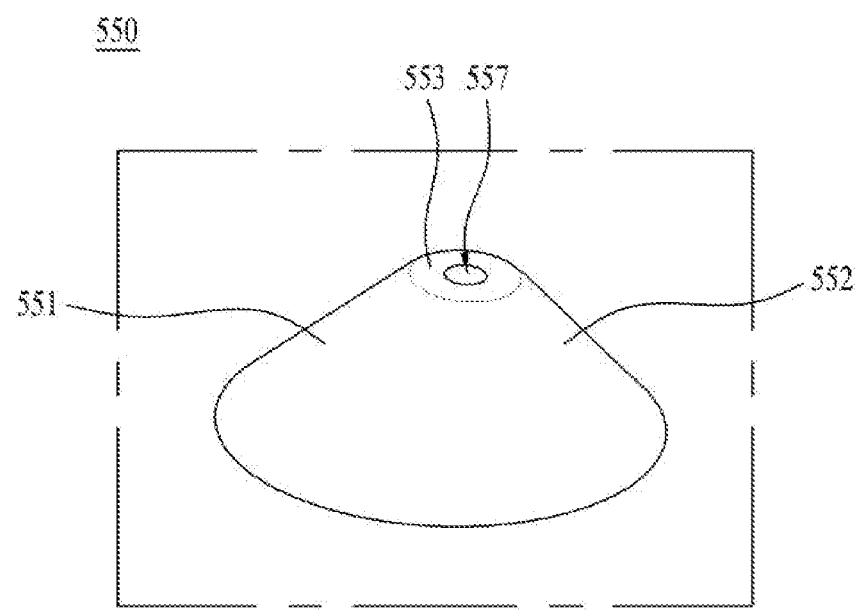
Figure 20E:
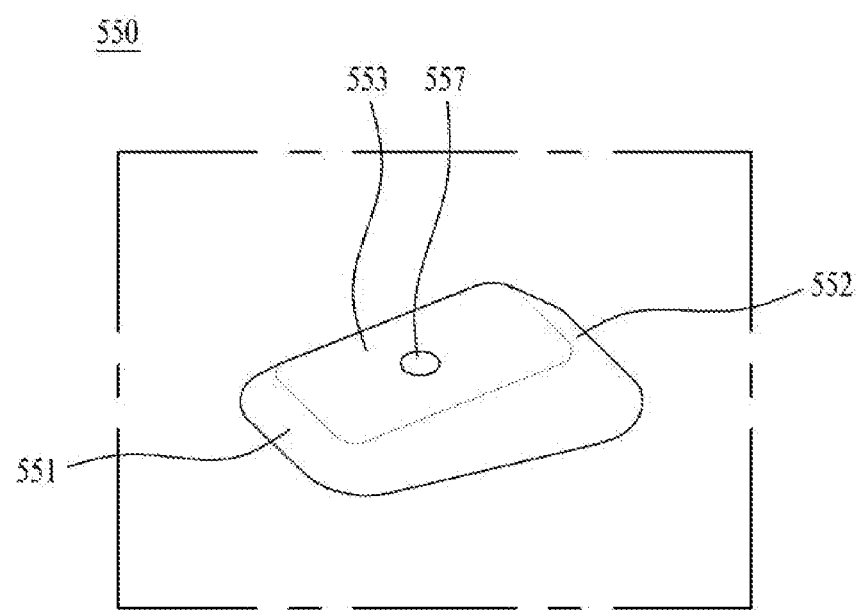

If necessary, as shown in FIG. 20C, at least one sub-projection 558 may be arranged at the top surface 553 of the projection 550.

The top surface 553 of the projection 550 may be rectangular, square, circular, oval, or trapezoidal.

The hole 557 or sub-projection 558 formed at the top surface 553 of the projection 550 may be fastened to an external circuit board attached to the supporting member 400, to fix the external circuit board.

FIGS. 21A to 21D are views explaining arrangement relations of the light source module with the first and second reflectors.

Figure 21A:
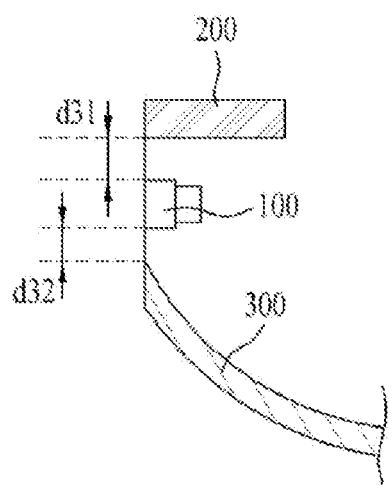
FIGS. 21A to 21D are views explaining arrangement relations of a light source module with first and second reflectors.
Figure 21B:
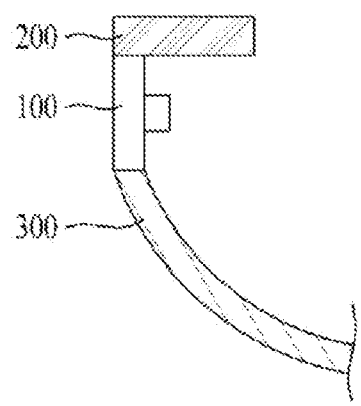
Figure 21C:
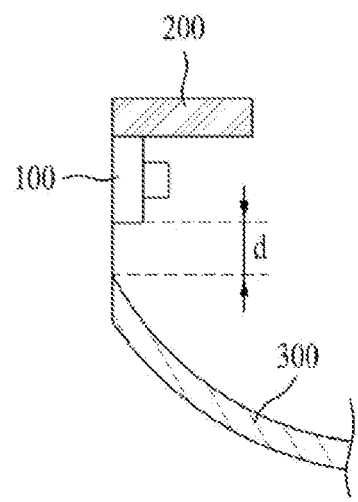
Figure 21D:
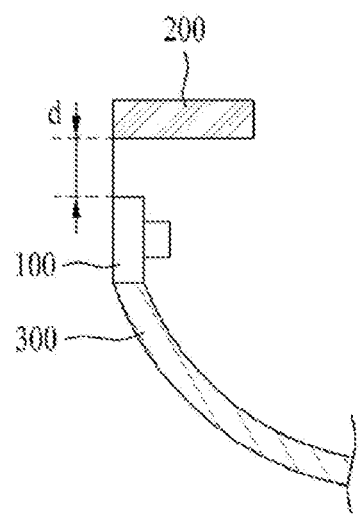

FIG. 21A is a view illustrating an arrangement in which the light source module 100 is spaced apart from the first and second reflectors 200 and 300 by predetermined distances, respectively. FIG. 21B is a view illustrating an arrangement in which the light source module 100 is in contact with both the first and second reflectors 200 and 300. FIG. 21C is a view illustrating an arrangement in which the light source module 100 is in contact with the first reflector 200 while being spaced apart from the second reflector 300 by a predetermined distance. FIG. 21D is a view illustrating an arrangement in which the light source module 100 is spaced apart from the first reflector 200 by a predetermined distance while being in contact with the second reflector 300.

As shown in FIG. 21A, the light source module 100 may be spaced apart from the first reflector 200 by a first distance d31 while being spaced apart from the second reflector 300 by a second distance d32.

The first and second distances d31 and d32 may be equal or may be different.

For example, the first distance d31 may be shorter than the second distance d32.

When the first distance d31 may be longer than the second distance d32, a hot spot phenomenon may occur.

As shown in FIG. 21B, the light source module 100 may be in contact with the first reflector 200 and second reflector 300.

When the light source module 100 are in contact with the first reflector 200 and second reflector 300, it may be possible to avoid a hot spot phenomenon, to transmit light to an area remote from the light source module 100, and to reduce the thickness of the entire structure of the illumination unit.

Also, as shown in FIG. 21C, the light source module 100 may be in contact with the first reflector 200 while being spaced apart from the second reflector 300 by a distance d.

In this case, it may be possible to avoid a hot spot phenomenon, and to transmit light to an area remote from the light source module 100 because the light source module 100 is in contact with the first reflector 200.

Alternatively, as shown in FIG. 21D, the light source module 100 may be spaced apart from the first reflector 200 by the distance d while being in contact with the second reflector 300.

Figure 22A:
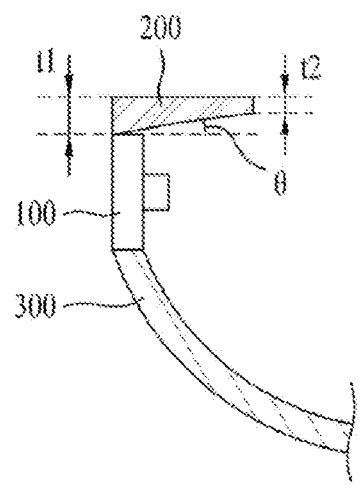
FIGS. 22A to 22D are views illustrating various structures of the first reflector which has an inclined surface.
Figure 22B:
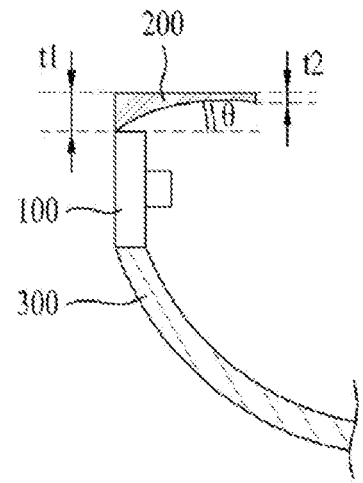
Figure 22C:
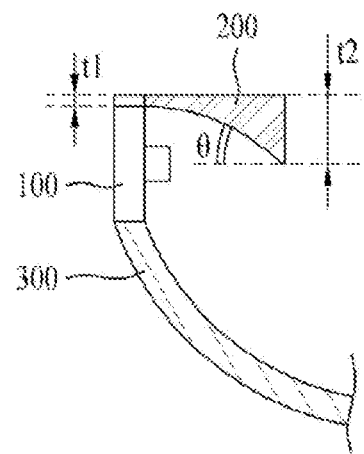
Figure 22D:
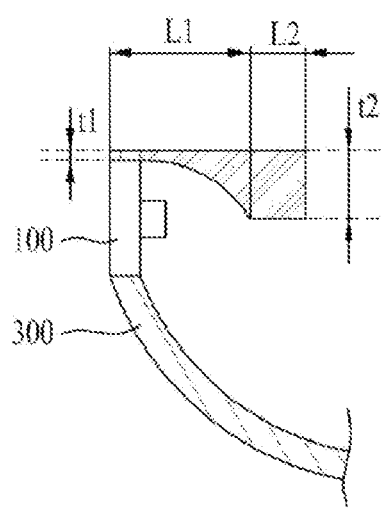

FIGS. 22A to 22D are views illustrating various structures of the first reflector which has an inclined surface. FIG. 22 An illustrates the case in which the inclined surface is a flat surface, whereas each of FIGS. 22B, 22C and 22D illustrates the case in which the inclined surface is a curved surface.

As shown in FIGS. 22A to 22D, one surface of the first reflector 200 facing the second reflector 300 may include an inclined surface having a predetermined inclination angle with respect to the other surface of the first reflector 200.

The inclined surface of the first reflector 200 may be inclined at an inclination angle θ of 1 to 85° with respect to a horizontal plane parallel to the other surface of the first reflector 200.

Thus, the thickness of the first reflector 200 may be gradually reduced or increased as the first reflector 200 is spaced away from the light source module 100.

Figure 23A:
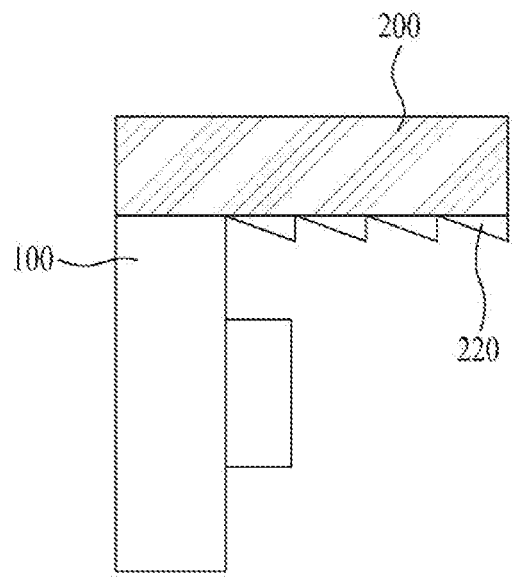
FIGS. 23A to 23D are views illustrating various structures of the first reflector which has reflection patterns, respectively.
Figure 23B:
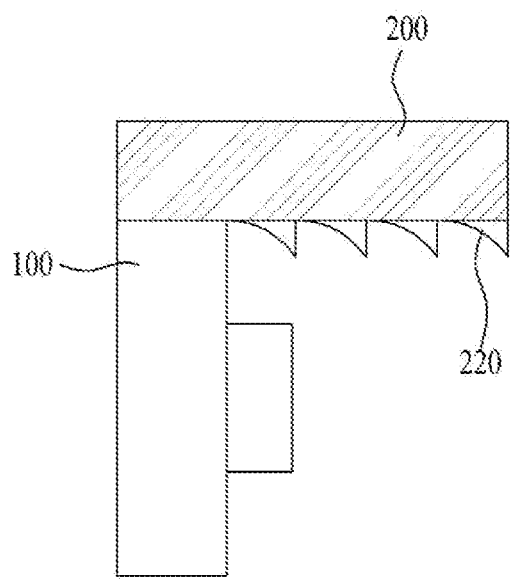

That is, the thickness of the first reflector 200 in a region adjacent to the light source module 100, namely, a thickness t1, may differ from the thickness of the first reflector 200 in a region remote from the light source module 100, namely, a thickness t2. As shown in FIGS. 23A and 23B, the thickness t1 in the region adjacent to the light source module 100 may be greater than the thickness t2 in the region remote from the light source module 100.

If necessary, as shown in FIGS. 22C and 22D, the thickness t1 in the region adjacent to the light source module 100 may be smaller than the thickness t2 in the region remote from the light source module 100.

Also, as shown in FIG. 22D, the first reflector 200 may include either an inclined surface or a flat surface.

That is, the first reflector 200 may include an inclined surface in a region adjacent to the light source module 100, and a flat surface in a region remote from the light source module 100.

In this case, the length of the inclined surface, namely, a length L1, may be equal to the length of the flat surface, namely, a length L2. If necessary, the lengths L1 and L2 may be different.

Predetermined reflection patterns may be formed at one surface of the first reflector 200.

FIGS. 23A to 23D are views illustrating various structures of the first reflector which has reflection patterns, respectively.

Figure 23C:
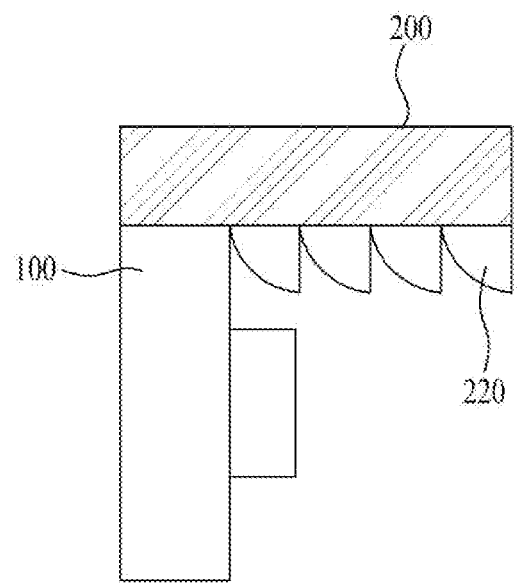

In the case of FIG. 23A, each reflection pattern, which is designated by reference numeral "220", may have a sawtooth shape, and the surface of the reflection pattern 220 may be a flat surface. In the case of FIG. 23B or 23C, the reflection pattern 220 may have a sawtooth shape, and the surface of the reflection pattern 220 may be a curved surface.

In the case of FIG. 23B, the surface of the reflection pattern 220 is a concave surface. In the case of FIG. 23C, the surface of the reflection pattern 220 is a convex surface.

Figure 23D:
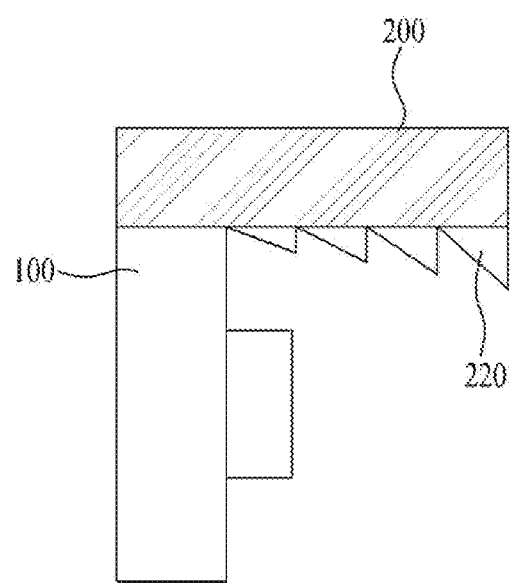

If necessary, as shown in FIG. 23D, the reflection pattern 200 may have a size gradually increasing as the reflection pattern 220 extends from an end of the first reflector 200 to an open region.

As the reflection patterns 220 are formed on the first reflector 200, it may be possible not only to achieve reflection of light, but also to obtain diffusion effects of uniformly dispersing light.

In this regard, the reflection patterns 220 may be formed at desired regions while having various sizes in accordance with the brightness distribution of the entire structure of the illumination unit.

Figure 24:
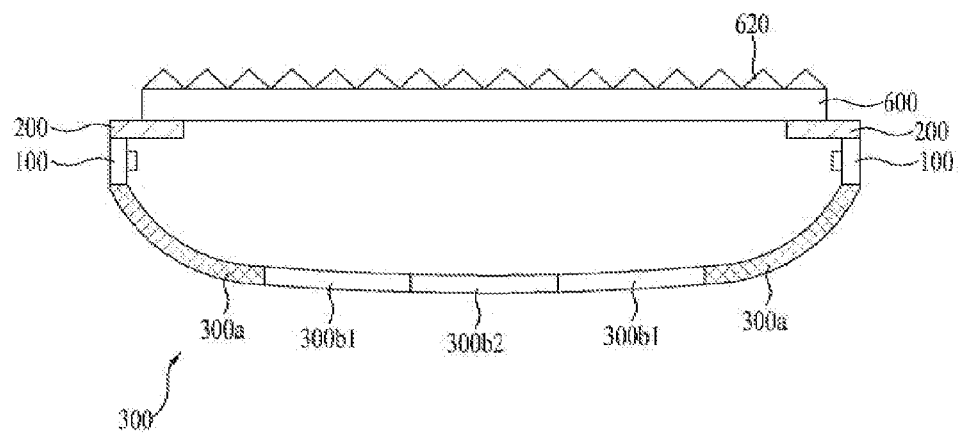
FIG. 24 is a sectional view illustrating a reflection surface of the second reflector.

FIG. 24 is a sectional view illustrating a reflection surface of the second reflector.

As shown in FIG. 24, the illumination unit may include light source modules 100 including light sources 110, first and second reflectors 200 and 300, an optical member 600.

In this case, the second reflector 300 may include a specular reflection region 300a and a diffuse reflection region 300b. The diffuse reflection region 300b may include a first diffuse reflection region 300b1 and a second diffuse reflection region 300b2.

The specular reflection region 300a may function to specularly reflect light incident thereupon, whereas the diffuse reflection region 300b may function to diffusively reflect light incident thereupon. The reflectance ratio between the specular reflection region 300a and the diffuse reflection region 300b may be about 50 to 99.99%.

Each of the first and second diffuse reflection regions 300b1 and 300b2 may include first reflection patterns for reflecting light in a Lambertian distribution manner, and second reflection patterns for reflecting light in a Gaussian distribution manner.

In the first diffuse reflection region 300b1, the first reflection patterns are less than the second reflection patterns. On the other hand, in the second diffuse reflection region 300b2, the first reflection patterns are more than the second reflection patterns.

The area ratio of the first diffuse reflection region 300b1 to the second diffuse reflection regions 300b2 may be about 1:1 to 5.

In this case, the area ratio of the specular reflection region 300a to the first diffuse reflection region 300b1 may be about 1:1 to 4, whereas the area ratio of the specular reflection region 300a to the second diffuse reflection region 300b2 may be about 1:1 to 20.

The reason why the area ratios of the specular reflection region 300a, first diffuse reflection region 300b1 and second diffuse reflection region 300b2 are predetermined is to reduce a brightness difference between a region adjacent to the light source module 100 and a region remote from the light source module 100.

That is, it may be possible to provide uniform brightness throughout the entire structure of the illumination unit by appropriately adjusting the area ratios of the specular reflection region 300a, first diffuse reflection region 300b1 and second diffuse reflection region 300b2.

The first diffuse reflection region 300b1 may be arranged between the specular reflection region 300a and the second diffuse reflection region 300b2.

That is, the specular reflection region 300a of the second reflector 300 may be adjacent to the light source module 100, whereas the second diffuse reflection region 300b2 may be remote from the light source module 100. The first diffuse reflection region 300b1 of the second reflector 300 may be arranged between the specular reflection region 300a and the second diffuse reflection region 300b2.

In accordance with the above-described arrangement, the specular reflection region 300a of the second reflector 300, which is arranged adjacent to the light source module 100, reflects light emitted from the light source module 100 toward the central region of the second reflector 300, and the diffuse reflection region 300b of the second reflector 300, which is arranged in the central region of the second reflector 300, diffuses light incident thereupon.

The optical member 600 may be spaced apart from the second reflector 300 by a predetermined distance, to form a space therebetween. An air guide region may be formed in a space defined between a bottom plate and the optical member 600.

A projection/groove pattern 620 may be provided at a surface of the optical member 600.

Figure 25:
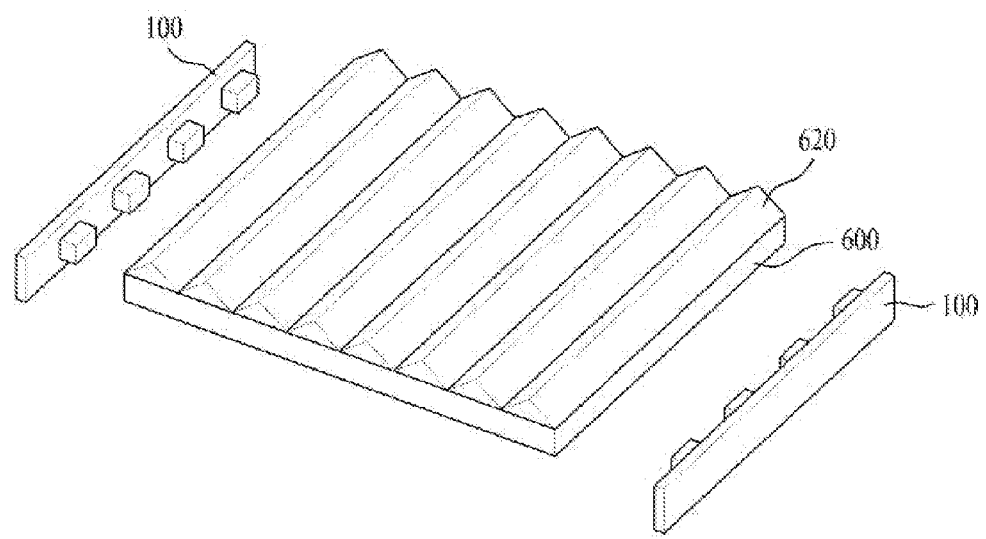
FIG. 25 is a perspective view illustrating an optical member.

FIG. 25 is a perspective view illustrating the optical member.

As shown in FIG. 25, the optical member 600 may have a multilayer structure having several layers. In this case, the projection/groove pattern 620 may be formed at a surface of an uppermost one of the layers or a surface of one of the layers.

If necessary, the optical member 600 may be formed using at least one sheet. In this case, the optical member 600 may selectively include a diffusion sheet, a prism sheet, a brightness enhancing sheet, etc.

The diffusion sheet diffuses light emitted from the light sources. The prism sheet guides diffused light to a light emission region. The brightness enhancing sheet enhances brightness of light.

Thus, the optical member 600 is adapted to diffuse light emitted from the light source module 100. In order to enhance diffusion effects, the projection/groove pattern 620 may be formed at an upper surface of the optical member 600.

The projection/groove pattern 620 may have a stripe shape extending along the light source module 100.

In this case, the projection/groove pattern 620 may include projections protruded from the surface of optical member 600. Each projection has first and second facets facing each other. The facing first and second facets form an angle, which may be acute or obtuse.

In the above-described embodiments, it may be possible to prevent damage of external circuits caused by static electricity or EMI, using a metallic supporting member to support the reflector.

Also, in the above-described embodiments, it may be possible to easily and simply connect external circuits by providing a plurality of fastening projections at the metallic supporting member.

In addition, in the above-described embodiments, the illumination unit employs a metallic supporting member having an inclined surface, and thus has an air guide region without employing a light guide plate. Accordingly, it may be possible to achieve a reduction in weight, a reduction in manufacturing cost, and uniformity of brightness.

Thus, the illumination unit may have enhanced economy and enhanced reliability.

Also, the supporting member, first and second reflectors, and light source modules described in conjunction with the above-described embodiments may be employed to implement a display apparatus, an indication apparatus or an illumination system. The illumination system may include, for example, a lamp or a street lamp.

Such an illumination system may be used as a lighting lamp including a plurality of LEDs to obtain condensed light. In particular, the illumination system may be used as a downlight which is built in the ceiling or wall of a building such that an opening side of a shade is exposed.

Figure 26:
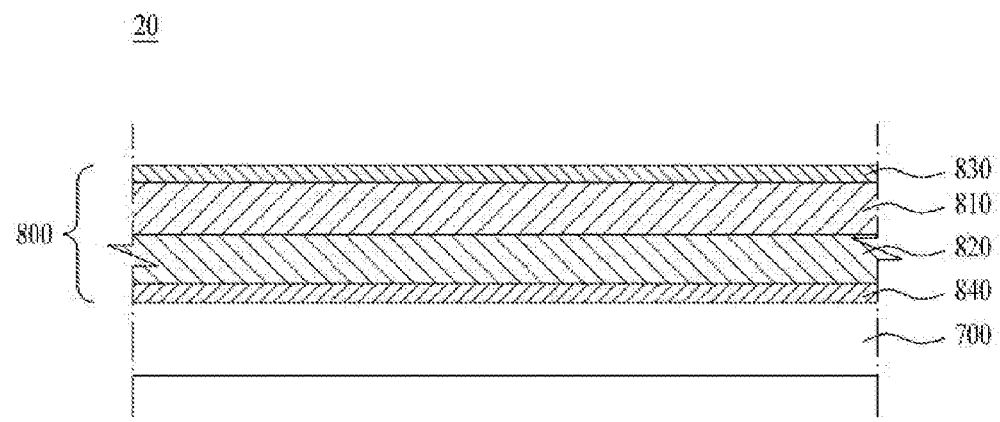
FIG. 26 is a view illustrating a display module including an illumination unit according to an embodiment.

FIG. 26 is a view illustrating a display module including an illumination unit according to an embodiment.

As shown in FIG. 26, the display module, which is designated by reference numeral "20", may include a display panel 800 and an illumination unit 700.

The display panel 800 may include a color filter substrate 810 and a thin film transistor (TFT) substrate 820, which are assembled to face each other while forming a uniform cell gap therebetween. A liquid crystal layer (not shown) may be interposed between the two substrates 810 and 820.

An upper polarization plate 830 and a lower polarization plate 840 may be disposed at upper and lower sides of the display panel 800, respectively. In more detail, the upper polarization plate 830 may be disposed on an upper surface of the color filter substrate 810, and the lower polarization plate 840 may be disposed on a lower surface of the TFT substrate 820.

Although not shown, a gate driver and a data driver may be disposed on a side surface of the display panel 800, to generate drive signals for driving of the panel 800.

Figure 27:
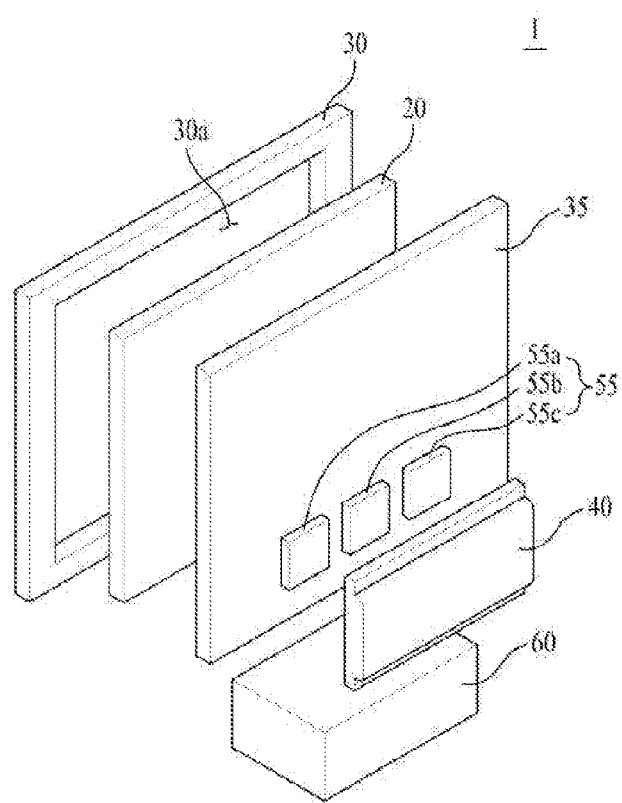
FIGS. 27 and 28 are views illustrating display apparatuses according to different embodiments, respectively.
Figure 28:
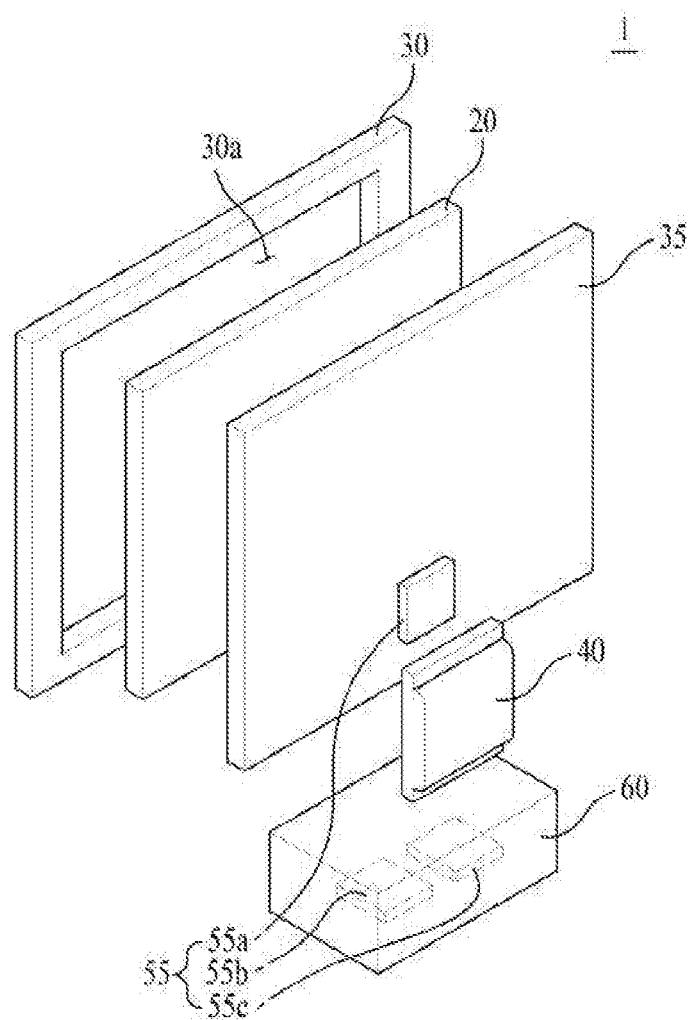

FIGS. 27 and 28 are views illustrating display apparatuses according to different embodiments, respectively.

Referring to FIG. 27, the display apparatus, which is designated by reference numeral "1", includes a display module 20, front and back covers 30 and 35 for surrounding the display module 20, a driver unit 55 mounted to the back cover 35, and a driver cover 40 for surrounding the driver unit 55.

The front cover 30 may include a front panel (not shown) made of a transparent material to allow light to pass therethrough. The front panel is spaced apart from the display module 20 to protect the display module 20. The front panel also allows light emitted from the display module 20 to pass therethrough, thereby allowing an image displayed by the display module 20 to be displayed to the outside of the display module 20.

The back cover 35 is coupled to the front cover 30 to protect the display module 20.

The driver unit 55 may be disposed on one surface of the back cover 35.

The driver unit 55 may include a drive controller 55a, a main board 55b, and a power supplier 55c.

The drive controller 55a may be a timing controller. The driver controller 55a is a driver to control operation timing of each driver IC included in the display module 20. The main board 55b is a driver for transferring V-sync, H-sync, and R, G, and B resolution signals to the timing controller. The power supplier 55c is a driver for applying electric power to the display module 20.

The driver unit 55 may be mounted to the back cover 35, and may be surrounded by the driver cover 40.

A plurality of holes is provided at the back cover 35, to connect the display module 20 and the driver unit 55. A stand 60 to support the display apparatus 1 may be provided.

On the other hand, as shown in FIG. 28, the drive controller 55a of the driver unit 55 may be provided at the back cover 35. The main board 55b and power supplier 55c may be provided at the stand 60.

The driver cover 40 may surround only the driver 55, which is provided at the back cover 35.

Although the main board 55b and power supplier 55c are separately provided in the illustrated embodiment, they may be integrated on a single board, without being limited thereto.

In another embodiment, the supporting member, first and second reflectors, and light source modules described in conjunction with the above-described embodiments may be employed to implement a display apparatus, an indication apparatus or an illumination system. The lighting system may include, for example, a lamp or a street lamp.

Such an illumination system may be used as a lighting lamp including a plurality of LEDs to obtain condensed light. In particular, the illumination system may be used as a built-in lamp (down light) which is built in the ceiling or wall of a building such that an opening side of a shade is exposed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination unit comprising:
    a first reflector;
    a second reflector;
    a light source module arranged between the first reflector and the second reflector; and
    a supporting member for supporting the second reflector,
    wherein the supporting member includes at least one inflection point,
    wherein the supporting member includes first and second inclined surfaces arranged adjacent to each other at opposite sides of the inflection point, and
    wherein the supporting member has a distance of 15 to 50 mm between a first horizontal line that horizontally passes through the inflection point and a second horizontal line that horizontally passes through an end of the first inclined surface or an end of the second inclined surface.

2. The illumination unit according to claim 1, wherein the supporting member includes a conductive material.

3. The illumination unit according to claim 1, wherein the supporting member includes:
    a nonconductor layer; and
    a conductor layer disposed on the nonconductor layer.

4. The illumination unit according to claim 1, wherein the supporting member has a plurality of hollows.

5. The illumination unit according to claim 4, wherein each of the hollows has at least one hole at a bottom of the hollow.

6. The illumination unit according to claim 4, wherein each of the hollows includes a first side surface and a second side surface facing the first side surface, the first side surface has a first height, and the second side surface has a second height different from the first height.

7. The illumination unit according to claim 1, wherein the supporting member includes:
a first surface facing the second reflector;
a second surface opposing the first surface; and
a plurality of projections respectively protruded to predetermined heights from the second surface.

8. The illumination unit according to claim 7, wherein each of the projections has at least one hole at a top of the projection.

9. The illumination unit according to claim 7, wherein each of the projections includes a third side surface and a fourth side surface opposing the third side surface, the third side surface has a third height, and the fourth side surface has a fourth height different from the third height.

10. The illumination unit according to claim 7, wherein each of the projections is an empty projection.

11. The illumination unit according to claim 1, wherein the first and second inclined surfaces of the supporting member have different radii of curvature.

12. The illumination unit according to claim 1, further comprising:
an optical member spaced apart from the second reflector by a predetermined distance to form a space between the optical member and the second reflector,
wherein an air guide region is formed in the space between the second reflector and the optical member.

13. An illumination unit comprising:
a first reflector;
a second reflector;
a light source module arranged between the first reflector and the second reflector; and
a supporting member for supporting the second reflector,
wherein the supporting member includes a plurality of projections respectively protruded to predetermined heights from the second surface,
wherein each of the projections includes third and fourth side surfaces opposing each other,
wherein the third and fourth side surfaces of the projection are asymmetrical, and
wherein the third side surface has a third height, the fourth side surface has a fourth height, and a ratio of the third height to the fourth height is 1:1.01 to 80 or 1.01 to 80:1.

14. The illumination unit according to claim 13, wherein:
the supporting member includes:
a first region adjacent to an edge of the supporting member,
a second region adjacent to a center of the supporting member, and
a third region between the first region and the second region;
at least one of the projections is in the first region, and the ratio of the third height to the fourth height in the projection in the first region is 1.01 to 80:1;
at least one of the projections is in the second region, and the ratio of the third height to the fourth height in the projection in the second region is 1:1.05 to 3; and
at least one of the projections is in the third region, and the ratio of the third height to the fourth height in the projection in the third region is 1:1.01 to 1.05.

15. The illumination unit according to claim 14, wherein the third side surface of each of the projections is spaced apart from the light source module by a first distance, the fourth side surface of the projection is spaced apart from the light source module by a second distance, and the first distance is shorter than the second distance.

16. The illumination unit according to claim 14, wherein:
each of the projections includes a top surface connecting the third side surface and the fourth side surface;
the top surface of the projection is flat;
the third side surface of the projection is inclined at a first angle from the top surface;
the fourth side surface of the projection is inclined at a second angle from the top surface; and
the first angle and the second angle are different.

17. The illumination unit according to claim 13, wherein each of the projections is an empty projection.

18. The illumination unit according to claim 13, wherein:
the supporting member includes first and second inclined surfaces arranged adjacent to each other at opposite sides of an inflection point; and
the supporting member has a distance of 15 to 50 mm between a first horizontal line that horizontally passes through the inflection point and a second horizontal line that horizontally passes through an end of the first inclined surface or an end of the second inclined surface.

19. The illumination unit according to claim 18, wherein the first and second inclined surfaces of the supporting member have different radii of curvature.

20. An illumination system comprising:
a panel; and
an illumination unit for irradiating light onto the panel,
wherein the illumination unit includes:
a first reflector,
a second reflector,
a light source module arranged between the first reflector and the second reflector, and
a supporting member for supporting the second reflector,
wherein the supporting member includes at least one inflection point,
wherein the supporting member includes first and second inclined surfaces arranged adjacent to each other at opposite sides of the inflection point, and
wherein the supporting member has a distance of 15 to 50 mm between a first horizontal line that horizontally passes through the inflection point and a second horizontal line that horizontally passes through an end of the first inclined surface or an end of the second inclined surface.

* * * * *